United States Patent [19]
Ahern et al.

[11] Patent Number: 5,411,654
[45] Date of Patent: May 2, 1995

[54] METHOD OF MAXIMIZING ANHARMONIC OSCILLATIONS IN DEUTERATED ALLOYS

[75] Inventors: Brian S. Ahern, Boxboro; Keith H. Johnson, Cambridge; Harry R. Clark, Jr., Townsend, all of Mass.

[73] Assignee: Massachusetts Institute of Technology, Cambridge, Mass.

[21] Appl. No.: 86,821

[22] Filed: Jul. 2, 1993

[51] Int. Cl.$^6$ .................... C25B 9/00; C25B 11/08; C25C 7/00; C25C 7/02

[52] U.S. Cl. .................... 204/242; 204/292; 204/293; 204/290 R

[58] Field of Search .................... 156/656; 204/129.1, 204/129.55, 140, 129.35, 224 M, 129.43, DIG. 9, 129.35, 129.7, 242, 292, 293, 290 R

[56] References Cited

U.S. PATENT DOCUMENTS

| | | | |
|---|---|---|---|
| 3,219,481 | 11/1965 | Chodosh et al. | 204/140 X |
| 3,620,844 | 11/1971 | Wicke et al. | 429/44 |
| 4,222,900 | 9/1980 | Bohl | 156/656 X |
| 4,284,482 | 8/1981 | Yahalom | 204/140 |
| 4,925,538 | 5/1990 | Matsumoto et al. | 204/140 X |
| 5,078,834 | 1/1992 | Witte | 156/656 |

OTHER PUBLICATIONS

Clerjaud and Gelineau, "Strong spin-lattice coupling of Kramers doublets", Phys. Rev. B, vol. 16, No. 1, Jul. 1977, 82–85.
Singh et al., "Effect of anharmonicity on superconducting metal-hydrogen systems," Phys. Rev. B, vol. 18, No. 7, Oct. 1978, 3271–74.
Huberman et al., "Chaotic States of Anharmonic Systems in Periodic Fields," Phys. Rev. Let., vol. 43, No. 23 Dec. 1979 1743–47.
Kohara et al., "NMR Study of Size Effects in . . . ," Jnl. Phys. Soc. Jap., vol. 54, No. 4, Apr. 1985, 1537–1542.
Hamann et al., "Anharmonic vibrational modes of Chemisorbed H . . . ," Phys. Rev. B, vol. 37, No. 8, Mar. 1988, 3847–3855.
Hemmes et al., "Isotope effects and pressure dep . . . ," Phys. Rev. B. vol. 39, No. 7, Mar. 1989, 4110–4118.
Fleschmann et al., "Electrochemically induced nuclear fusion . . . ," J. Electroanal. Chem., 261, Mar. 1989, 301–308.
Jones et al., "Observation of cold nuclear fusion . . . ," Nature, vol. 338, Apr. 1989, 737–740.
Yokoyama et al., "Temperature-dependent EXAFS Study . . . " Jap. J. Appl. Phys., vol. 28, No. 5, Apr. 1989, L851–L853.
Yokoyama et al., "Temperature dependent EXAFS Study . . . ," Physica B, 158, no month 1989, 255–256.

(List continued on next page.)

*Primary Examiner*—Donald R. Valentine
*Attorney, Agent, or Firm*—Theresa A. Lober

[57] ABSTRACT

For a condensed matter system containing a guest interstitial species such as hydrogen or its isotopes dissolved in the condensed matter host lattice, the invention provides tuning of the molecular orbital degeneracy of the host lattice to enhance the anharmonicity of the dissolved guest sublattice to achieve a large anharmonic displacement amplitude and a correspondingly small distance of closest approach of the guest nuclei. The tuned electron molecular orbital topology of the host lattice creates an energy state giving rise to degenerate sublattice orbitals related to the second nearest neighbors of the guest bonding orbitals. Thus, it is the nuclei of the guest sublattice that are set in anharmonic motion as a result of the orbital topology. This promotion of second nearest neighbor bonding between sublattice nuclei leads to enhanced interaction between nuclei of the sublattice. In the invention, a method for producing dynamic anharmonic oscillations of a condensed matter guest species dissolved in a condensed matter host lattice is provided. Host lattice surfaces are treated to provide surface features on at least a portion of the host lattice surfaces; the features have a radius of curvature less than 0.5 microns. Upon dissolution of the guest species in the treated host lattice in a ratio of at least 0.5, the guest species undergoes the dynamic anharmonic oscillations.

16 Claims, 12 Drawing Sheets

OTHER PUBLICATIONS

Johnson et al., "Hydrogen–Hydrogen/Deuterium–Deuterium . . . ," Mod. Phys. Lett., vol. 3, No. 10, no month 1989, 795–803.

McNally, "On the possibility of a nuclear mass-energy . . . ," Fusion Tech., vol. 16, May 1989, 237–239.

Prelas, "Advanced energy conversion methods for cold fusion," Fus. Tech., vol. 16, May 1989, 240–242.

Ragheb et al., "On the possibility of deuteron disintegration . . . ," Fus. Tech., vol. 16, May 1989, 243–247.

Rogers, "Isotopic hydrogen fusion in metals," Fusion Tech., vol. 16, May 1989, 254–259.

Oka, "Electrochemically induced deuterium–tritium fusion," Fusion Tech., vol. 16, May 1989, 260–262.

Oka et al., "$D_2O$-fueled fusion power reactor . . . ," Fusion Tech., vol. 16, May 1989, 263–267.

Stacey, "Reactor prospects of muon-catalyzed fusion . . . ," Fusion Tech., vol. 16, May 1989, 268–275.

Yokoyama et al., "Temperature-dependent EXAFS study," Jap. J. Appl. Phys., vol. 29, No. 10, Oct. 1990, 2052–58.

Huot et al., "Low Hydrogen overpotential Nanocrystalline . . . " J. Electrochem. Soc., vol. 138, No. 5, May 1991, 1316–1320.

Potvin et al., "Study of the Kinetics of the Hydrogen . . . ," J. Electrochem. Soc., vol. 138, No. 4, Apr. 1991, 900–905.

Galbaatar et al., "On the influence of anharmonicity . . . ," Physica C, 185–189, no month 1991, 1529–1530.

Suryanarayana et al., "The structure and Mechanical Props . . . ," Mettal. Trans. A, vol. 23A, Apr. 1992, 1071–1081.

Kolesnikov et al., "Strong anharmonic H(D) vibrations," Physica B 180 & 181, no month 1992, 284–286.

Cahen et al., "Room-temperature, Electric-field . . . ," Science, vol. 258, Oct. 1992, 271–274.

Koleske et al., "Temperature dependence and anharmonicity of . . . ," Surface Science, 298, Jul. 1993, 215–224.

Fleischmann et al., "Calorimetry of the Pd–D20 System . . . ," Physics Letters, A 176, Mar. 1993, 1–12.

Flach et al., "Integrability and localized excitations . . . ," Physical Review E, vol. 49, No. 1, Jan. 1994, 836–850.

Reifenschweiler, "reduced radioactivity of tritium . . . ," Physics Letters A, 184, Dec. 1994, 149–153.

Copper　　　　　Nickel　　　　　Palladium

METHOD OF MAXIMIZING ANHARMONIC OSCILLATIONS IN DEUTERATED ALLOYS

GOVERNMENT RIGHTS IN THE INVENTION

This invention was made with U.S. Government support under contract No. F19628-90-C-0002, awarded by the Force. The Government has certain rights in this invention.

FIELD OF THE INVENTION

This invention relates to techniques for enhancing conditions for causing anharmonic oscillations in protonated and deuterated alloys, leading to enhanced electron tunneling between degenerate molecular orbitals and enhanced nuclei interaction; and more particularly relates to materials processing techniques for maximizing anharmonic oscillations of hydrogen isotope nuclei in the interstices of such alloys.

BACKGROUND OF THE INVENTION

Strong force nuclear interaction of hydrogen isotopes, deuterium in particular, have been extensively studied in the regime above 30,000 eV. Tunneling phenomena through the Coulomb barrier has been well characterized and described as requiring tunneling through a barrier of 0.7 Å in width and 400,000 eV in height.

Interaction of nuclei in a palladium-deuterium condensed matter system has been shown to be $10^7$ times more probable than the Coulomb tunneling described above. The reposed successes in this system are best accounted for by a palladium-deuterium interaction scheme occurring in the presence of strong wave function overlap. It has been shown that such wavefunction overlap may be achieved via specific molecular orbital degeneracy conditions.

Fundamental shifts in the molecular orbital topology of a condensed matter system are known to be achievable via sub-micron, nanometrically-sized surface features. Such nanometric space features alter the surface and near surface electrochemistry of a condensed matter system, and thereby effect the orbital topology of the system. This effect cannot be attributed to a simple increase in surface area; rather, the surface character at the nanoscale can only be predicted from a real-space molecular orbital perspective. The resulting properties are purely quantum-mechanical in nature, i.e., they cannot be derived by a simple extension of continuum elasticity theory to the nanoregime. Thus, nanometric, low-dimensional surface features can be expected to interact with electromagnetic fields and radiation in a corresponding quantum-mechanical nature.

SUMMARY OF THE INVENTION

In view of the above considerations, the inventors herein have recognized that for a condensed matter system containing a guest interstitial species such as hydrogen or its isotopes dissolved in the condensed matter host lattice, tuning of the molecular orbital degeneracy of the host lattice via the methods of the invention enhances the anharmonicity of the dissolved guest sublattice to achieve a large anharmonic displacement amplitude and a correspondingly small distance of closest approach of the guest nuclei. The electron molecular orbital topology of the host lattice creates an energy state giving rise to degenerate sublattice orbitals related to the second nearest neighbors of the guest bonding orbitals. Thus, it is the nuclei of the guest sublattice that are set in anharmonic motion as a result of the orbital topology.

The invention provides methods for enhancing this guest lattice anharmonicity such that promotion of second nearest neighbor bonding between sublattice nuclei leads to enhanced interaction between nuclei of the sublattice.

In one aspect, the invention provides a method for producing dynamic anharmonic oscillations of a condensed matter guest species dissolved in a condensed matter host lattice. In the method, host lattice surfaces are treated to provide surface features on at least a portion of the host lattice surfaces; the features have a radius of curvature less than 0.5 microns. Thereupon dissolution of the guest species in the host lattice in a ratio of at least 0.5, the guest species undergoes the dynamic anharmonic oscillations.

In preferred embodiments, the host lattice comprises palladium, a palladium silver alloy, preferably $Pd_{.77}Ag_{.23}$, or nickel. The guest species comprises hydrogen or deuterium. Preferably, the surface features of the host lattice have a radius of curvature less than 0.3 microns, and more preferably, less than 0.2 microns. The guest species is dissolved in the host lattice preferably in a ratio of at least 0.8. In prefer, red embodiments, the dynamic oscillations are characterized by an oscillation amplitude of at least 0.5 Å and an oscillation frequency of at least $10^{10}$ Hz. Preferably, the dynamic oscillations are sustained over time such that interaction of guest species nuclei is initiated and maintained over time.

In other preferred embodiments the host lattice comprises a sheet of palladium silver alloy, preferably wound to form a coiled tube of the sheet. The gust species dissolution is preferably accomplished by submerging the host lattice is an electrolytic solution of the guest species. A platinum-coated anode is submerged in the solution and a voltage is applied between the host lattice and the anode; preferably the voltage is a square wave signal having a DC offset voltage, where the signal is characterized by a time varying amplitude no less than 0.93 volts and a frequency between about 5 Hz and 2000 Hz.

In other preferred embodiments, a host lattice is provided by a continuous wire that is drawn through a diamond die which has been processed to include relief structures on inner surfaces, the relief structures having a radius of curvature less than 0.5 microns. Preferably, the wire is a continuous nickel wire or a multiclad wire consisting of a nickel core surrounded by a layer of palladium, and the inner surfaces of the die result from laser processing of the inner surfaces.

In other preferred embodiments, the host lattic surface is treated by lapping the surface using a polishing slurry or scribing the surface with a diamond stylus. Preferably, the diamond stylus has a working tip diameter less than 0.5 microns; more preferably the scribing is accomplished using an array of tips all positioned on a common stylus fixture, and after the scribing, the surface is anodically etched with a hydrochloric acid solution undergoing ultrasonic agitation.

In other preferred embodiments, the lattice surface is treated by anodic etching of the surface, or chemical vapor deposition or molecular beam epitaxy of host lattice material on a substrate. Preferably, the host lattice surface is treated by lithographically defining a pattern of surface features on at least one surface and etching the patterned surface to produce the surface features. Preferably, the patterned surface is anodically etched, and the etching results in V-shaped surface grooves, rectangular-shaped surface channels, or prismatic asperities.

In another aspect, the invention provides apparatus for producing dynamic anharmonic oscillations of a condensed matter guest species. The apparatus includes a condensed matter host lattice having surface features of a radius of curvature less than 0.5 microns on at least a portion of its surfaces, and apparatus of dissolving the guest species in the host lattice in a ratio of at least 0.5, the guest species undergoing the oscillations upon dissolution in the host lattice.

In preferred embodiments, the guest species is provided in an electrolytic solution of the guest species; the electrolytic solution is preferably a solution of heavy or light water and $K_2CO_3$.

In another aspect the invention provides a host lattice for causing a guest species dissolved in the host lattice to undergo dynamic anharmonic oscillations according to the methods of the invention. Preferably, the host lattice comprises a coiled tube formed of a sheet of palladium silver alloy. In other preferred embodiments, the host lattice comprises a superlattice of first and second submaterials alternately layered in layers of between 10 and 100 nanometers in thickness. Preferably, the host lattice submaterials are nickel and copper, or nickel and palladium, or copper and palladium. In other preferred embodiments, the host lattice structure has been cold worked, and comprises a nanograined polycrystalline morphology.

Other features and advantages of the invention will be apparent from the description of a preferred embodiment, and from the claims.

DESCRIPTION OF A PREFERRED EMBODIMENT

Figure 1:
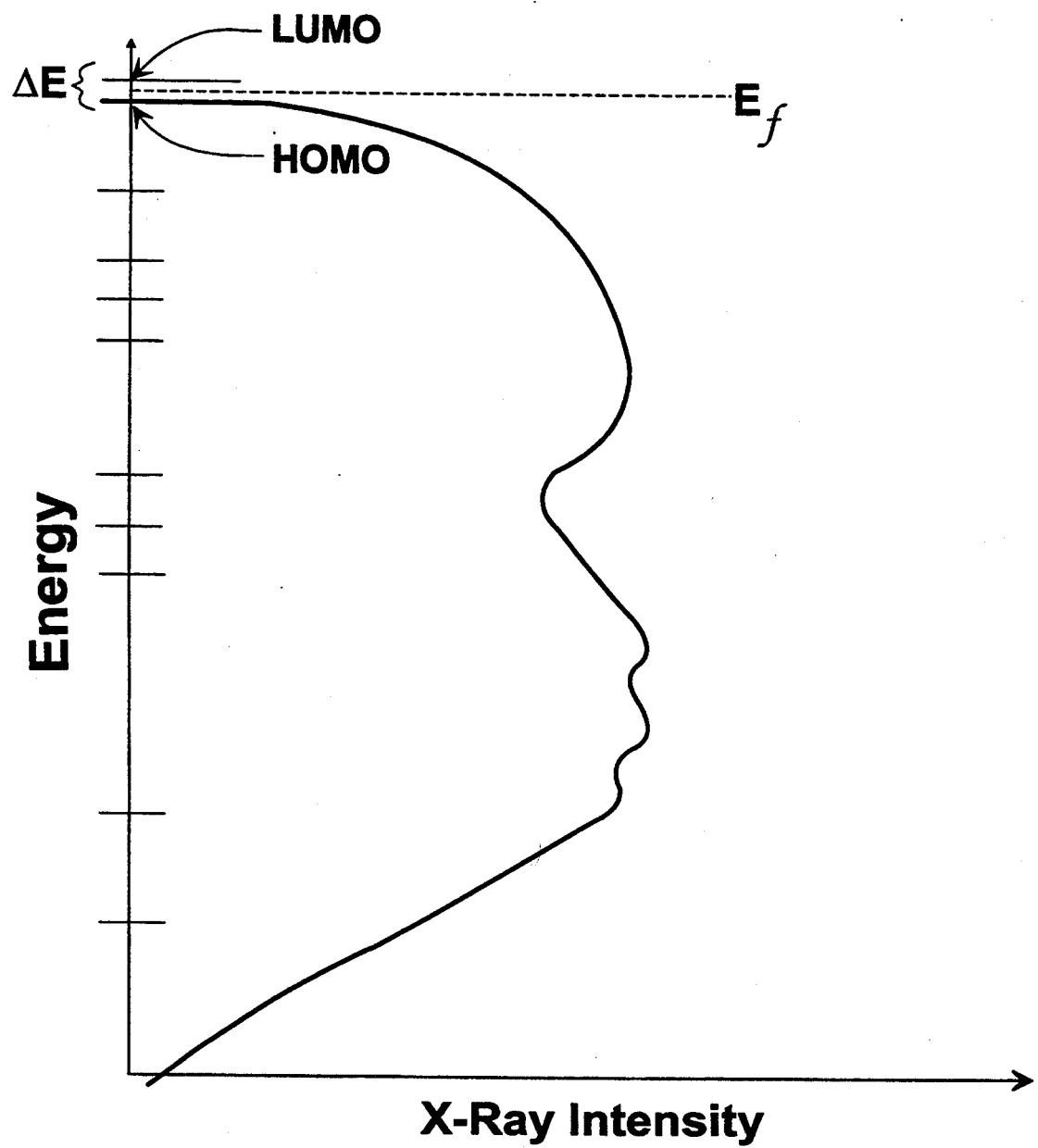
FIG. 1 is a rendering of a conventional X-ray photo-spectroscopy plot of X-ray intensity as a function of molecular orbital energy for a hypothetical condensed matter sample.

We first present a discussion of anharmonicity in condensed matter. Referring to FIG. 1, there is shown a conventional X-ray photo-spectroscopy plot of X-ray intensity (horizontal axis) as a function of molecular orbital energy (vertical axis) for a hypothetical condensed matter sample. The vertical axis also depicts specific molecular orbital energy levels for the sample. Beginning with the orbital of lowest energy, some number of molecular orbitals of the sample are fully occupied, up to an energy level above which the molecular orbitals are unoccupied. The fully occupied orbitals are each associated with a specific symmetry and steric state. The Fermi energy, $E_f$, is defined as that energy level halfway between the energy level of the highest occupied molecular orbital (HOMO) and that of the lowest unoccupied molecular orbital (LUMO). The energy gap, $\Delta E$, is defined as the energy difference between the energy levels of the HOMO and LUMO.

As the temperature of a sample is increased or radiation is applied to the sample, the population of the HOMO shifts toward the LUMO, and the mean energy of the molecular orbitals shifts a corresponding amount. Under certain arrangements of matter, the HOMO and LUMO can actually co-exist at the same energy level. This condition is referred to as orbital degeneracy. Under degenerate molecular orbital conditions, condensed matter systems generally find it energetically favorable to lower the free energy of the system by dynamically distorting, or in extreme cases, statically distorting to a state of symmetry lower than its existing symmetry state. An example of such a distortion is a cubic material undergoing a trigonal lattice distortion.

This static distortion is one embodiment of the well-known Jahn-Teller effect, relating to condensed matter distortion. According to the Jahn-Teller effect, when electron molecular orbital degeneracy conditions are achieved, both static distortions and dynamic distortions are possible and both result in an energetically more favorable state. Of great importance is the fact that under dynamically degenerate conditions the electrons in the degenerate molecular orbitals can tunnel back and forth in space between degenerate orbitals, centered on separate atoms, at very high rates, where the tunneling rate is denoted as $\omega_c$. The amplitudes of these tunneling oscillations are under certain conditions so large that the positive nuclei of the parent atoms to the tunneling electrons respond to the oscillations in some fashion, i.e., the electron oscillations may couple to the parent nuclei lattice. In this case, the amplitude of the oscillations of the parent nuclei, in response to the electron tunneling oscillations, is termed $\delta$.

Figure 2A:
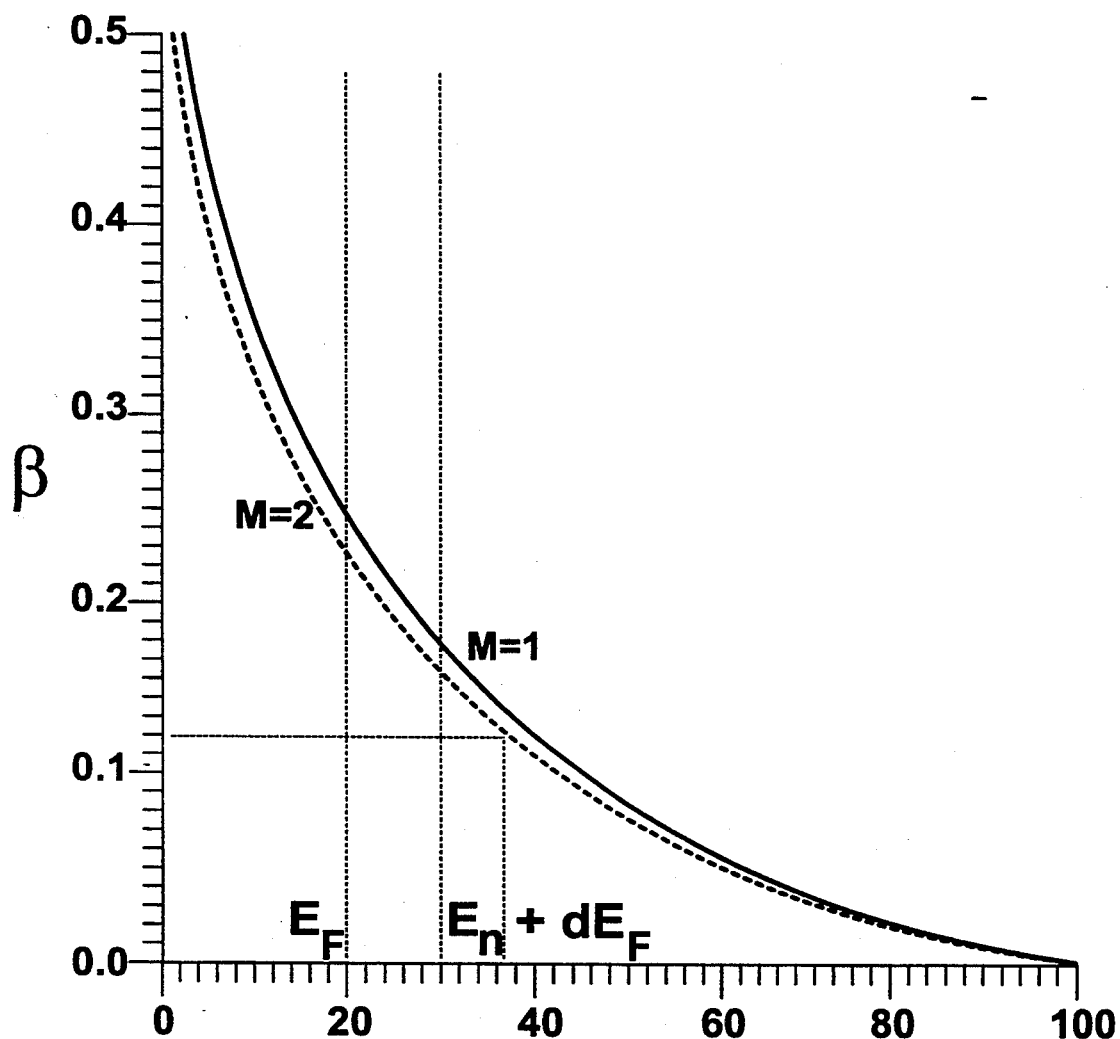
FIG. 2A is a plot of the Jahn-Teller coupling parameter $\beta$ as a function of the percent bond overlap of electron molecular orbitals of second nearest neighbor hydrogen atoms near the Fermi energy.

Referring to FIG. 2A, the Jahn-Teller coupling parameter, $\beta$, characterizes the degree of degeneracy of a particular molecular orbital energy configuration, and correlates that degree to a measure of the electronic molecular orbital overlap of the configuration. The coupling parameter $\beta$ has a range between 0 and $\frac{1}{2}$. For a condensed matter lattice characterized by $\beta = \frac{1}{2}$, the lattice is not experiencing Jahn-Teller tunneling oscillations, but rather, oscillations are characterized as thermal parabolic oscillations expected of harmonic oscillation behavior. As the local bonding arrangements of the condensed lattice are shifted towards degeneracy, the $\beta$ parameter decreases below $\frac{1}{2}$, and the overlap of molecular orbitals increases. The tunneling oscillations of electrons in the degenerate molecular orbitals become less and less harmonic in character. This type of tunneling oscillation is referred to as anharmonic oscillation because the oscillations are derived from statistical fluctuations in molecular orbital occupancy and are nearly insensitive to temperature, unlike harmonic oscillations, which are thermal in nature. In general, systems characterized by a $\beta$ parameter less than about $\frac{1}{4}$ become so structurally unstable during dynamic tunneling oscillations that they statically distort to a lower symmetry and settle into a new harmonic condition, like the cubic to trigonal distortion mentioned above.

A method for predicting the molecular orbital overlap resulting from a given orbital degeneracy is given in "Hydrogen-hydrogen/deuterium-deuterium bonding in palladium and the superconducting/electrochemical properties of $PdH_xPdD_x$," by Dr. Keith Johnson, et al, *Modern Physics Letters B*, Vol. 3, no. 10, pp. 795–803, July 1989, and is herein incorporated by reference. Based on this orbital overlap prediction technique, which provides a method for quantizing the Jahn-Teller coupling parameter, $\beta$, the orbital degeneracy of a condensed lattice system may be selectively "tuned", or specified, to provide a desired degree of molecular orbital overlap. By tuning the degeneracy of the system to, e.g., increase the system degeneracy, the $\beta$ coupling parameter characterizing the material is in turn (or inherently) decreased.

Referring again to FIG. 1, as the degeneracy of a condensed matter system is tuned so that the HOMO and LUMO come closer together, the energy gap, $\Delta E$, between the HOMO and LUMO approaches zero. The magnitude of this energy gap is directly related to the rate of molecular orbital electron tunneling, $T_R$, by:

$$T_R = Ae^{-\Delta E/KT} \tag{1}$$

where:
K is the Boltzmann constant
T is degrees Kelvin.

From this relationship (1) it is clear that as the energy gap between the HOMO and LUMO approaches zero, the electron tunneling rate $T_R$ correspondingly increases.

At high tunneling rates, the tunneling electrons impart their oscillatory motion to the corresponding parent nuclei; the nuclei are effectively "dragged" through the anharmonic oscillatory motion of the tunneling electrons. Thus, the corresponding rate of anharmonic nuclei oscillation, is also, as expected, related to the degree of molecular orbital overlap, via the coupling parameter $\beta$. The frequency of nuclei oscillations, $\omega_c$, in terms of the coupling parameter, is given as:

$$\omega_c = h(m_e/M_i)^\beta / 2m_e d^2 \tag{2}$$

where:
$m_e$ = mass of electron
$M_i$ = mass of parent nuclei
$\beta$ = Jahn-Teller coupling parameter (quantified based on the orbital overlap-degeneracy prediction model)
d = separation between second nearest neighbor nuclei (the correlation distance between molecular orbitals of opposite phase, $\Psi+$ and $\Psi-$ (not the lattice parameter))
h = Plank's constant.

Figure 2B:
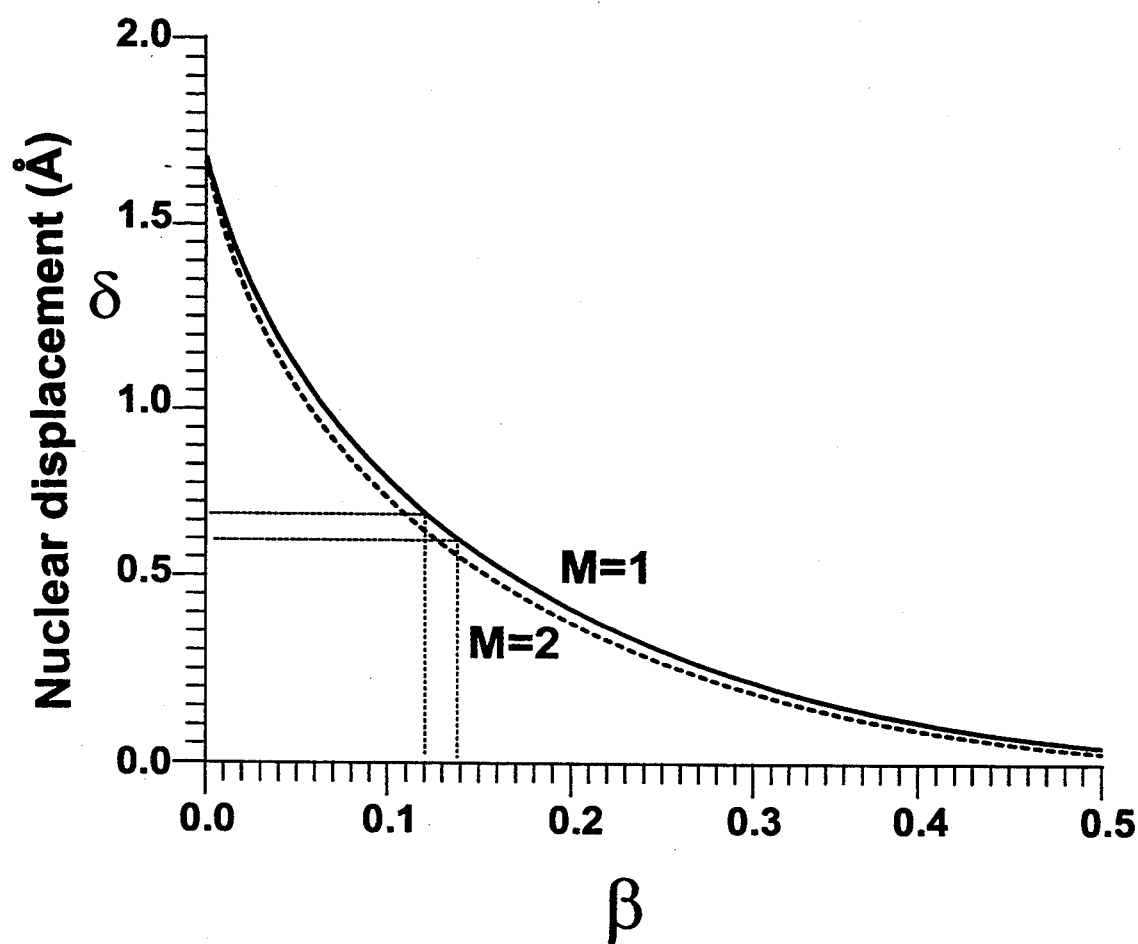
FIG. 2B is a plot of nuclear displacement oscillation amplitude as a function of the Jahn-Teller coupling parameter $\beta$.

Referring to FIG. 2B, the amplitude of parent nuclei oscillation, $\delta$, resulting from the degree of anharmonicity caused by orbital overlap, as given by the coupling parameter $\beta$, mathematically ranges between 0–1.7 Å, for $\beta$ ranging between 0–0.5, although, as explained above, $\beta$ values dose to zero are physically meaningless. The details of bonding overlap, however, restrict the value of $\beta$ to above 0.1. Thus, referring also to FIG. 2A, a measure of the coupling parameter $\beta$ provides a means for correlating a degree of molecular orbital overlap, or degeneracy, to the amplitude of nuclear displacement resulting from anharmonic oscillations of electrons in the degenerate molecular orbitals. The relationship nuclear displacement amplitude, $\delta$, to the Jahn-Teller coupling parameter, $\beta$, is quantified as:

$$\delta = (m_e/M_i)^\beta d. \tag{3}$$

Based on this relationship, as illustrated in FIG. 2B, it is seen that as $\beta$ decreases from 0.5 toward 0.1 (becoming more degenerate) the parent nuclei (e.g., deuteron) displacement amplitude $\delta$ increases to over 10 times the amplitude associated with thermal (harmonic) oscillations. In fact, the parent nuclei displacement amplitude may realistically approach or exceed 0.6 Å.

The average distance of closest approach of adjacent parent nuclei which are anharmonically oscillating is determined based on the displacement amplitude $\delta$, described above, and the interstitial site distance between two such oscillating nuclei. With this interstitial distance between the nuclei, or bond separation parameter, given as d, the average distance of closest approach for adjacent anharmonically oscillating nuclei is given as d-2$\delta$. This distance may be equivalently considered as the average distance of penetration into the coulomb barrier achieved by adjacent oscillating nuclei.

The inventors herein have recognized that the probability for interaction of neighboring nuclei may be dramatically increased via enhancement of the anharmonic nuclei oscillation phenomenon discussed above, and further that this anharmonic oscillation may be "tuned" by specifying a particular molecular orbital degeneracy (and corresponding electron orbital tunneling) via a corresponding degree of molecular orbital overlap. Both the anharmonic oscillation nuclei displacement amplitude, $\delta$, and the frequency of anharmonic oscillation, $\omega_c$, were shown above to be strongly dependent on $\beta$, the Jahn-Teller coupling parameter, which provides a measure of the molecular orbital overlap, or degeneracy, for a given system. The probability for two nuclei to interact will be shown below to be strongly dependent on the distance of closest approach between any two nuclei, given above as d-2$\delta$, and the frequency at which this closest approach occurs. The coupling parameter $\beta$ thus provides a mechanism for correlating a given state of molecular orbital degeneracy with a probability of nuclei interaction. To achieve a maximum probability for interstitial nuclei interaction, then, a molecular orbital degeneracy state is selected which, for a given condensed matter system, minimizes the distance of closest approach of nuclei during oscillations while at the same time maximizing the frequency of those oscillations.

For a condensed matter system containing hydrogen, deuterium, tritium, or other interstitial species dissolved in a host lattice, the inventors herein have recognized that by "tuning" the molecular orbital degeneracy of the host lattice, the anharmonicity of the dissolved hydrogen or deuterium nuclei sublattice residing in the host lattice may be enhanced to achieve the conditions described above, i.e., a large displacement amplitude, $\delta$, of the hydrogen or deuterium nuclei and a correspondingly small distance of closest approach, and a high oscillation frequency of deuterium or hydrogen nuclei. It must be emphasized that it is the electron molecular orbital topology of the host lattice that creates an energy state giving rise to degenerate sublattice orbitals related to the second nearest neighbors of, e.g., H—H guest bonding orbitals. Thus, it is the nuclei of the guest sublattice that are set in anharmonic motion as a result of the orbital topology.

The invention herein provides methods for enhancing this sublattice anharmonicity via "tuning" of the host lattice molecular orbital degeneracy. These methods, described below, all provide common results: they act to promote second nearest neighbor bonding between sublattice nuclei; and they thereby promote maximization of the anharmonic oscillation amplitude and oscillation frequency of the sublattice nuclei.

A variety of metal alloys have been investigated to determine that alloy, which by the nature of its molecular orbital degeneracy, maximizes anharmonic oscillations of deuterium or hydrogen dissolved in the alloy lattice. The molecular orbital overlap, corresponding coupling parameter $\beta$, and anharmonicity of deuterated palladium alloyed with lead, bismuth, titanium, silver, copper, zirconium, germanium, silicon, aluminum, thallium, and gold has been investigated, as well as deuterated nickel alloyed with titanium. "Deuterated" is here defined to include any of the three hydrogen isotopes deuterium, tritium, and protons. All of the investigated alloys possess tetrahedral and octahedral interstitial sites, yet not all of the alloys serve to enhance the molecular orbital degeneracy of interstitial guest species. Based on an analysis of the degree of molecular orbital degeneracy of each of the palladium alloys, palladium silver is the preferred alloy, as it maximizes hydrogen isotope anharmonicity.

In pure palladium and palladium alloys, the lattice parameter, a, of the palladium atoms in the lattice $\approx 3.6$ Å. The space in the palladium lattice may be populated by a guest species, e.g., introduction of deuterium nuclei dissolved in the lattice to occupy octahedral and tetrahedral interstitial locations of the lattice, via electrolytic charging. After this charging, the deuterium nuclei constitute second nearest neighbors (with each other) in a degenerate orbital condition. Deuterium is the preferred guest nuclei species, but hydrogen is also an acceptable guest species.

While the separation between second nearest neighbor deuterium nuclei located at octahedral interstitial sites within the host lattice is 3.6 Å, the same length as the palladium lattice parameter, once electrolytic charging of deuterium reaches a high level, the deuterium nuclei begin to populate the smaller tetrahedral interstitial sites of palladium and its alloys, and the distance between a neighboring interstitial tetrahedral and octahedral site is 1.7 Å, less than one-half the lattice parameter distance. Thus, deuterium nuclei populating adjacent octahedral and tetrahedral sites are closer together, and have a higher spatial density, than nuclei populating only octahedral sites.

This small equilibrium distance between tetrahedral and octahedral sited deuterium nuclei, in combination with enhanced anharmonic oscillations of those nuclei, create the conditions necessary for enhanced interaction between the deuterium nuclei.

Of the metal alloys investigated, it is found that palladium silver provides the highest degree of guest deuterium nuclei anharmonicity. This silver compound increases the $d\Delta\text{-}s\sigma$, antibonding component of the palladium-deuterium molecular orbitals, at concentrations up to about 23% silver, thereby promoting more overlap of the second nearest neighbor D—D($s\sigma$) bonding molecular orbitals and providing an enhanced molecular orbital degeneracy. A particular deuterated palladium silver compound, $Pd_{.77}Ag_{.23}D$, is preferred for a bulk alloy embodiment, but other palladium silver compounds, as well as other metal compounds such as Au—Ni, Cu—Pd, Cu—Ni, Ni—Pd, Cu—Ni, Ni—Ti, Zr—P, Pd—P, Ni—Zr, Zr—Pd, and Zr—Ti also provide a degree of anharmonicity sufficient to enhance interaction of deuterium nuclei in the alloy lattice. Thus, while the following discussion focuses on palladium silver, it must be recognized that other alloy compounds are also suitable.

Using the molecular orbital overlap modeling technique of Johnson described above, the computed bond overlap of $Pd_{.77}Ag_{.23}D$ (near the Fermi level) is calculated to be 35%. Using the graphical relationships in FIGS. 2A and 2B, this bond overlap correlates to a Jahn-Teller coupling parameter $\beta$ of 0.13, and a deuterium nuclei anharmonic oscillation amplitude, $\delta$, equal to 0.6. Then, using the relationship (d-2$\delta$), given above, for determining the average distance of closest approach for anharmonically oscillating deuterons in the palladium alloy lattice, with the bond separation parameter, d, being 1.7 Å between an octahedral and tetrahedral deuterium nuclei, the average distance of closest approach of a D—D nuclei pair is 0.5 Å. This distance is closer than even the bond distance in deuterium gas, which is 0.7 Å. The average distance of closest approach must be reduced below 0.5 Å to observe any strong force interactions at a rate above the expected background rate. Thus, the probability, or expectation value, of finding an anharmonically oscillating deuteron pair inside the strong force envelope is dramatically enhanced by small reductions in this distance of closest approach to reduce this distance below 0.5 Å.

Specific details of the energy potential between the deuterium atoms in this anharmonic system are unknown. However, a semi-qualitative analysis may be performed using an expression derived by Sichlen and Jones for the rate, R, of D—D nuclei interaction, using a Morse potential, as follows:

$$R = Ae^{(-\lambda(r_d))} \tag{4}$$

where

A = the nuclei interaction attempt rate
$\lambda(r_d)$ = the reaction distance
$(r_d)$ = the Coulomb barrier penetration factor.

Factoring out the barrier width, such that $\lambda(r_d) = [(d-2\delta) - \lambda'(r_d)]$ and using $(d-2\delta) = 1.05$ and $\lambda(r_d) = 180$ for a $D_2$ molecule, and setting A equal to the anharmonic oscillation frequency, $\omega_c$ the interaction rate of deuterium nuclei in a deuterium molecule is $10^{-70}$ interactions/D—D pair/sec, at room temperature.

Using the substitutions given above for the palladium system at room temperature, the equation is correlated to a PdD system given by:

$$R = \omega_c e^{-(d-2\delta)171}. \tag{5}$$

Substituting the values of (d-2δ) as 1.05 Å for the system of PdD, a deuterium nuclei interaction rate of $10^{-50}$ is indicated. In contrast, substituting $5 \times 10^{11}$ rad/sec and 0.5 Å for the values of $\omega_c$ and (d-2δ), respectively, computed for the system of $Pd_{.77}Ag_{.23}D$, indicates a deuterium nuclei interaction rate of $7 \times 10^{-27}$ interactions/D—D pair/sec under the enhanced anharmonic conditions set up by the $Pd_{.77}Ag_{.23}$ host lattice. Based on this analysis, it is clear that deuterium nuclei interaction is significantly promoted by anharmonic oscillation conditions.

The nature of the strong force nuclei interaction having a rate quantified by the above equation is not here specified; rather, the chemical and physical conditions that amplify the probability for the occurrence of this strong force interaction are provided by the enhanced anharmonicity system of the invention.

Optimally, the strong force interaction of deuterium nuclei which are anharmonically oscillating occurs in the host lattice with a high degree of coherency. The more non-linear, or anharmonic, the deuterium sub-lattice behaves, the higher the coherency of the anharmonic oscillations. Condensed matter systems in which the deuteron nuclei motions are synchronized to such a high degree are expected to generally tend toward conditions that favor 3- and 4-body strong force interactions. Such many-bodied, cooperative oscillations permit 3 nuclei to be confined in, or close to, the strong force envelope simultaneously, providing a corresponding increase in interaction potential. Prediction of reaction by-products of 3- and 4-body strong force interactions are beyond current understanding. High energy scattering experiments are of no predictive use, owing to the immeasurably low probability of even a 3-body interaction.

It must also be recognized that the anharmonic tunneling oscillations described herein occur in a space regime such that the inertial wavelength of the deuterons is much greater than that typically associated with high-energy events. Thus, substantial overlap of the wave-functions of nearby nuclei, even those outside of the interaction envelope of a nuclei pair, can be expected. Additionally, interference effects of the low-energy tunneling oscillations can not be dismissed. Indeed, the energy of the deuterated palladium silver system is computed to be seven orders of magnitude lower than the lowest energy scattering experiments ($\approx 20,000$ eV compared with 20 meV). Conversely, the deBroglie wavelength of a wave/particle deuteron is increased by $\sqrt{10^7}$ over that of scatter high energy experiments. Thus, interference effects of the tunneling phenomena can not be discounted.

Anharmonic oscillations resulting from specific molecular orbital degeneracy may be understood from another viewpoint. The amplitude, δ, of the anharmonic oscillations may be equated with the energy of the oscillating system. The energy of the oscillator thereby correlates a wavelength with the oscillating particle. When the wavelength, λ, of an anharmonically oscillating deuteron coincides with the length of a potential well, here the Coulomb barrier, a resonance is expected. Tuning of the anharmonicity of a condensed matter system thus acts to adjust the wavelength of the wave/particle entity (here, the deuteron) to induce particular resonances. The induced resonance further enhances the oscillation amplitude, δ, and can dramatically increase the probability of a strong force interaction between neighboring nuclei.

The inventors herein have recognized that in addition to precisely selecting an alloy host lattice for enhancing anharmonicity of guest deuterium nuclei, the application of an electric field may be employed to shift the HOMO and LUMO populations and energy spectra of a given host lattice to achieve molecular orbital degeneracy and enhanced anharmonicity. It is recognized, however, that E-fields are confined to the near-surface region of conducting materials. Therefore, E-fields only control the system anharmonicity in a region of the system whose depth is less than about 200 Å-deep into the bulk of a host material. Additionally, the inventors herein have recognized a third mechanism for tuning the degeneracy and anharmonicity of a system, namely, using nanometric surface preparation (NSP) techniques on the host lattice. Such preparation is intended to impart nanoscale surface topology to the host lattice; this topology acts to create a low coordination of the surface atoms. Surfaces with a low coordination of atoms develop anharmonic properties owing to orbital delocalization at regions of high curvature, where the radius of curvature of such regions is generally less than 0.2 μm. Nanometric surface preparation, like the application of E-fields, is confined to effect only the surface and near surface regions of a host lattice. Each of these anharmonicity tuning mechanisms will be described in tun below.

Electric fields, which are limited to the near surface of a metal, make substantial changes to the local force constants and accompanying vibrational response of near-surface atoms of a metal. Anharmonic oscillations driven by molecular orbital degeneracy are modified by the applications of electric fields, mediated by the local adjustments to the force constants. However, these effects are distributed over the interaction distance of the anharmonic potentials, which may extend normal to the surface over many lattice parameters.

As described below it is intended that a "tuned" degenerate host lattice be charged, via electrolysis, to populate interstitial sites with deuterium. The strong electric fields developed during such electrolysis is recognized to provide two effects, based on an understanding of the system: a strong E-field insures that a high concentration of deuterium (or other guest species) is obtained and maintained within the lattice; and a strong E-field provides a driving force to further delocalize the D(1s) orbitals of the host lattice nuclei, beyond that resulting from a particular selection of host alloy. Fields on the order of $10^4$–$10^7$ Volts/cm occur within and at the surface of conducting materials undergoing electrolysis, extending normal to the surface on the order of nanometers, The exact quantification of the effect of an E-field on the surface can not be made at this time. However, Hellman-Feynman theory suggests that the E-fields act on the population of electron molecular orbitals, which action can be systematically employed to shift the Fermi energy in a direction leading to further degeneracy, for the proper E-field polarity. Of course, the E-field may detract from a particular orbital population as well, depending on the E-field polarity; hence it is appropriate to consider the application of an E-field as degeneracy tuning.

Consider $Pd_{.77}Ag_{.23}D$, discussed above as providing a high degree of enhanced deuterium anharmonicity and a rate of deuterium nuclei interaction of $7 \times 10^{-27}$ interactions/D—D pair/sec. The application of an electric field to this system during, e.g., electrolysis, further delocalizes the already degenerate molecular orbitals by an additional 5–10%, resulting in an increase of the anharmonic oscillation amplitude, δ, of the deuterium nuclei by an additional 0.1 Å beyond the 0.6 Å oscillation amplitude caused by the anharmonic conditions of the $Pd_{.77}Ag_{.23}D$ alloy lattice alone. In this case, the barrier penetration parameter, or average distance of closest approach, of two deuterium nuclei, is then 0.5 Å, and the rate of deuterium nuclei strong force interactions increases from $7 \times 10^{-27}$ interactions/D—D pair/sec to $4.6 \times 10^{-10}$ interactions/D—D pair/sec. Thus, the application of an E-field, e.g., during electrolysis, increases the interaction rate by seventeen orders of magnitude. As explained previously, the nature of these interactions is not here specified; rather, chemical and physical conditions that promote the occurrence of these interactions are provided by the enhanced anharmonicity system of the invention.

For the majority of materials having properties which lend them as a host lattice, and particularly for nickel and nickel alloys, the anharmonicity tuning mechanisms of E-field applications and nanometric surface preparation do not present a hinderance to system performance, because ideal heat transfer favors a surface phenomenon, and these mechanisms promote anharmonicity at the surface, rather than the bulk of the material.

The third anharmonicity tuning mechanism of the invention, nanometric surface preparation (NSP), acts to adjust the local coordination of surface atoms, as explained above. High curvature surfaces, such as prismatic edges and asperities, are optimal low atomic coordination surfaces, and may be fabricated with existing technology to create a high density of such features with nanometric curvature radii of less than 0.2 μm. The new atomic coordinations produced by the resulting surface topology induce variations in electron molecular orbitals expected of atoms of a smooth surface; these electron molecular orbitals have different size, shape, orientation and, perhaps most importantly, population than those associated with a smooth surface. The new molecular orbital occupancy levels associated with this lower atomic coordination tend to shift the Fermi level such that the degeneracy of the system is increased, and the anharmonicity of the system is correspondingly increased. Additionally, NSP surfaces enhance the dissolution of hydrogen isotopes in a host lattice during electrolysis, thereby promoting population of tetrahedral sites in the host lattice.

Considered in another way, partitioning of a highly nonlinear, i.e., anharmonic, solid such as the $Pd_{.77}Ag_{.23}D$ alloy so that the alloy is nanometrically discretized, using, for example, NSP methods of the invention, leads to enormous vibrational instabilities in the solid, and correspondingly large vibration spectra. That is, atomic scale discreteness effects give rise to localized vibrational states that would not exist in a continuum, nondiscretized system. It is these localized vibrational states that provide the large amplitude anharmonicity recognized by the inventors herein as the foundation for enhancing nuclear interaction between nearest neighbor guest species in a host lattice. The existence and quantification of the correlation between nanometric partitioning and vibrational instabilities is provided by, for example, Dauzois and Peyard, "Energy Localization in Nonlinear Lattices," *Physical Review Letters*, Vol. 70, No. 25, Jun. 21, 1993, pp. 3935-3938; and Kivshar and Peyard, "Modulational instabilities in discrete lattices," *Physics Review A*, Vol. 46, No. 6, Sep. 15, 1992, p. 3198.

Several host lattice surface preparation techniques are preferred to produce this effect, but those skilled in the art will recognize that other techniques are equally applicable to achieve the desired increase in anharmonicity. These techniques can be classified into two categories: first, post-processing techniques, such as wire drawing, nanoscribing, lithography, and back-etching, and secondly, materials synthesis techniques, such as CVD, MBE, ED, or PVD over articulated surfaces, surface coatings, and selective binary compound etching, all of which are described below.

In a first technique for providing nanoscopic topology to the surface of a host lattice material, the host lattice material, in the form of wire, is drawn through a diamond die which has been processed to include relief topology. Such a topology is achieved on a diamond die by positioning a high-power laser, for example, a $CO_2$ or YAG laser, focussed to a spot size of less than 30 μm, at sufficient power to ablate diamond, to locally evaporate carbon on the inside radial surface of the die. The laser is focused to a desired diameter spot size, which is preferably not more than 30 μm, and either raster scanned or modulated in a pulsed fashion along the inner wall of the diamond die.

This rastering or pulsing action results in the effective "drilling" of bevelled holes in the diamond die. Pulsed laser sources, as opposed to continuous wave sources, provide the most flexibility for "customizing" the imparted relief topology. By selectively programming the rastering and dwell time of the laser as it is applied to the inner wall of a diamond die, the inner wall surface of the die may be sculptured in a predefined way to provide bevelled features. The resulting features may be smoothed with a laser annealing step or subsequent diamond paste polishing step to remove rough spots on the interior of the holes. Preferably, in this application, the diamond die is processed to intentionally impart nanometric and microscopic features into the trailing edge, i.e., smallest diameter, of the die.

In an alternative technique, a diamond abrasive, in the form of a paste, may be applied to a diamond die to provide topology on the inner surface of the die by scoring that surface as the paste is passed through the die.

Once a diamond die is processed to include on its inner surface nanometric-sized bevelled features or scored asperities, host lattice wire, e.g., nickel or palladium wire, is drawn through the die. After being drawn through the die, the wire will take on the relief structure of the die; handling care is called for to avoid post-process rounding of the nanometrically sharp features on the drawn wire. Indeed, conventional wire drawing technology is designed to minimize topological features on drawn wire, and thus, typically includes a surface polishing step. Such a polishing step is disadvantageous for this process.

Specific preferable steps of the wire drawing process are as follows. Prior to being drawn through a prepared diamond die, the wire to be processed is cleaned via a series of solvent washes, for example: wash (1)—15 minute immersion in 40° C. trichloroethane with ultrasonic agitation; wash (2)—15 minute immersion in fresh 40° C. trichloroethane with ultrasonic agitation; wash (3)—15 minute immersion in room-temperature acetone with ultrasonic agitation; wash (4)—15 minute immersion in room-temperature methanol with ultrasonic agitation; wash (5)—15 minute immersion in room-temperature isopropanol with ultrasonic agitation; and final wash (6)—30 minute rinse in distilled water. After this cleaning process, the wire is drawn through the die while being lubricated. A suitable lubricant is selected based on the need to avoid organic contamination of the alloy surface.

Figure 3A:
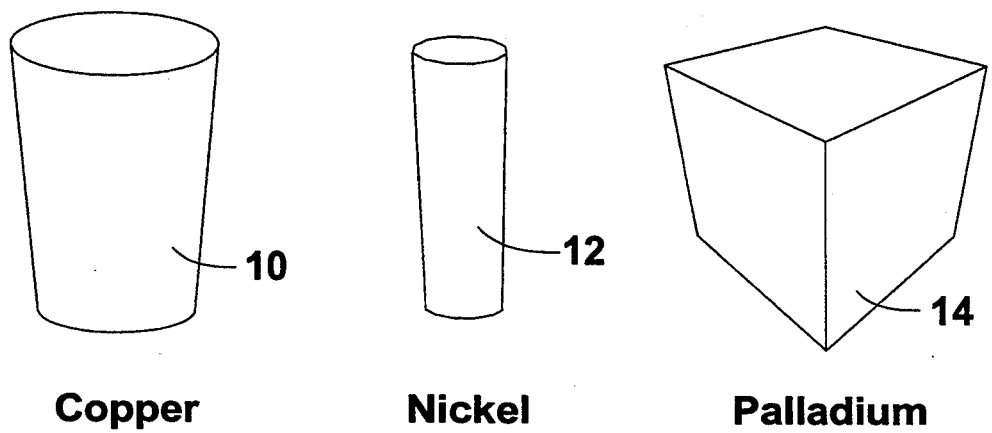
FIGS. 3A-3D illustrate the steps of producing a palladium-nickel clad wire according to one aspect of the invention.
Figure 3B:
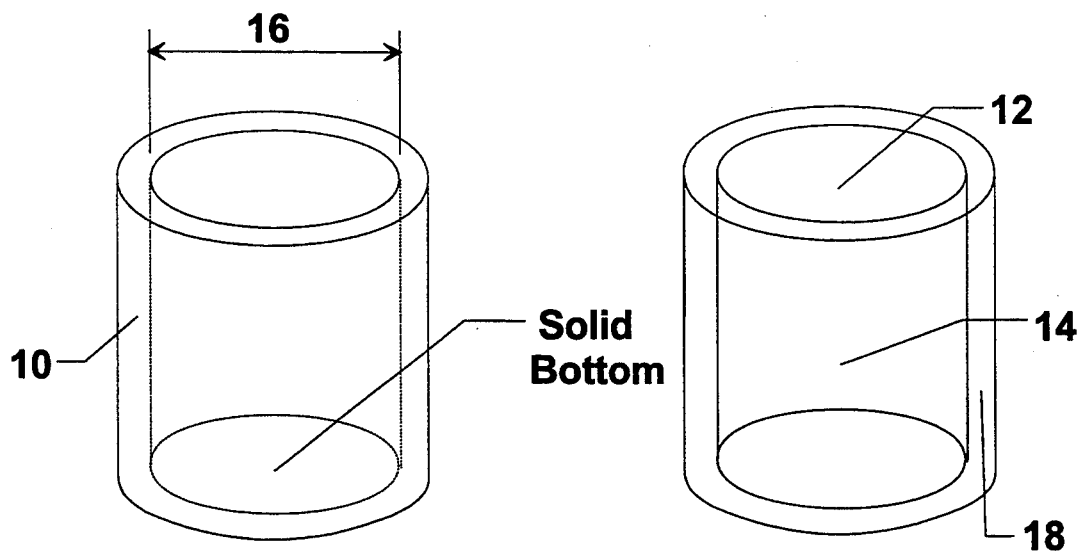
Figure 3C:
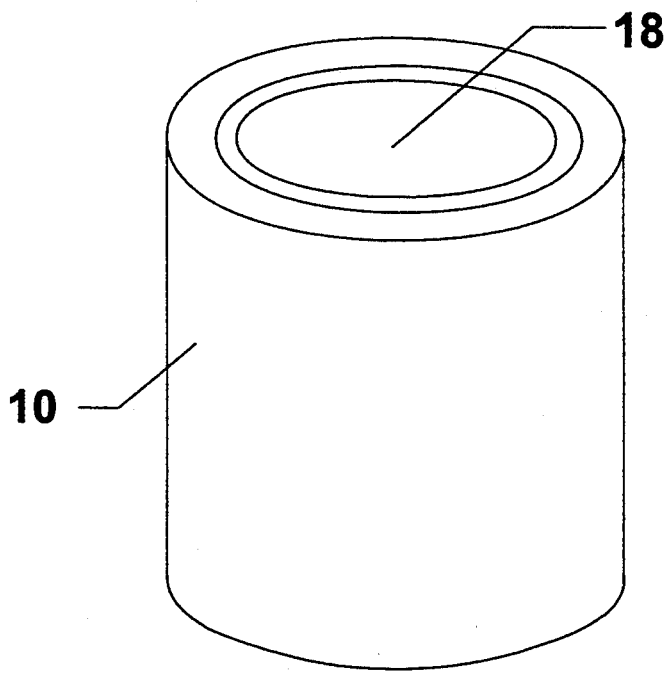
Figure 3D:
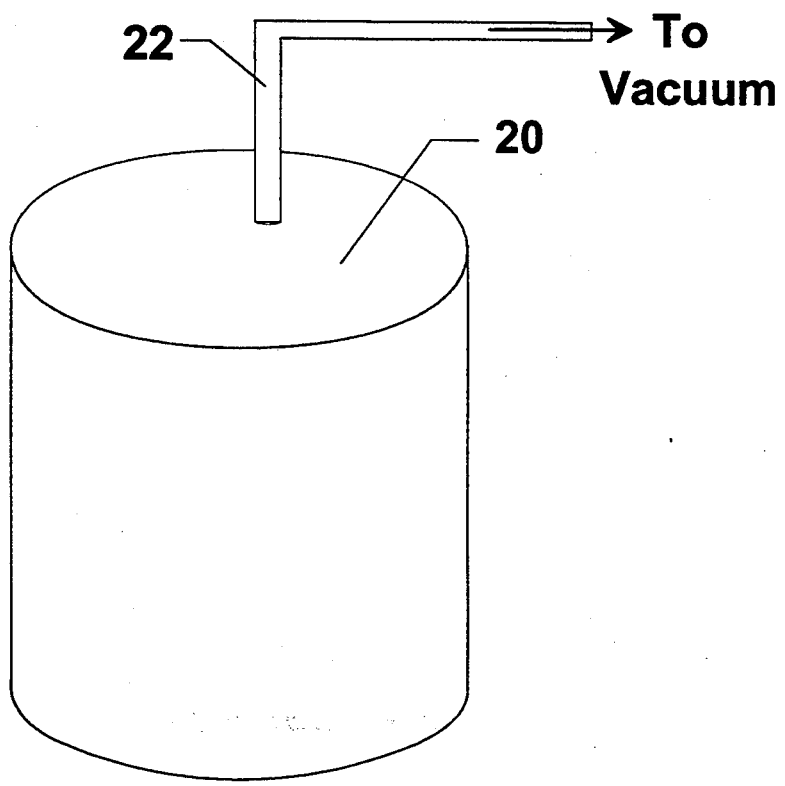

In an alternate embodiment, multi-clad wire of nickel and palladium may be fabricated to provide enhanced anharmonicity due to both a specific alloy combination and surface topology. Referring to FIG. 3A, such multi-clad wire is fabricated using a solid, cylindrical copper rod 10, a solid, cylindrical nickel rod 12 of a diameter less than the diameter of the copper rod, and a palladium sheet 14 having a length equal to that of the copper and nickel rods. The length and diameters of the rods are determined based on the desired final length and diameter of the multi-clad wire to be produced. In a first fabrication step, shown in FIG. 3B, the copper rod 10 is machined to remove copper from the interior of the rod, thereby creating a copper tube. The inner diameter 16 of the copper tube is preferably machined to match the diameter of a cylindrical assembly 18 comprising the nickel rod 12 around which is wrapped the palladium sheet 14. In a next step, shown in FIG. 3C, the nickel rod-palladium sheet assembly 18 is pressed into the copper tube 10 to form a billet. As shown in FIG. 3D, a copper cap 20 having a centrally located hole is then welded to one end of the billet and a pumping lead 22 is attached to the cap hole.

The pumping lead 22 is connected to a vacuum system and the billet is evacuated via the system for approximately 12 hours at a temperature of 300° C. At the end of the evacuation period, the pumping lead 22 is weld-sealed to isolate the billet from atmosphere, and the assembly is cooled to room temperature. Once the billet is cooled, it is extruded, using conventional extruding techniques, to have an outside diameter of not more than 2 inches. Then, using a group of successively smaller dies, the extruded billet (now a wire) is drawn through the dies from largest die to smallest, in sequence, to reach a final desired diameter. After the final die drawing, the copper cladding tube is etched off of the palladium sheet to expose the palladium-nickel assembly. A solution of Hf/HNO$_3$ at room temperature, using standard etching and rinsing techniques, adequately removes the copper and cleans the palladium surface. The resulting multi-clad wire may be used as is or alternatively, the wire may be drawn through a diamond die having surface features on its inner walls, using the process described above, to form the desired surface asperities on the wire.

In an alternative embodiment, an arbitrarily-shaped host lattice material piece may be mechanically processed to create a planar surface having nanometric topology using a lapping process as follows. If the piece is rather small, it is first mounted on a quartz optical fiat using a low-melting point temperature wax. The optical fiat is first positioned on a hot plate at approximately 90° C. The temperature of the optical fiat is then increased until a small portion of wax melts on the fiat, at which point the rectangular piece is positioned on the melted wax. The optical fiat, now supporting the rectangular sample, is then removed from the hot plate and cooled to room temperature.

The host lattice sample alone, or a supported smaller sample is positioned on a nylon lapping pad of a standard lapping plate on a polishing wheel. A polishing slurry consisting of standard soluble 5 $\mu$m diamond oil paste and mineral kerosine is loaded on the wheel to lubricate the sample during the lapping process. With the lubricated sample in place, the wheel is run for about 30 minutes, throughout which time the lubrication is maintained.

At the end of the 30 minute-lapping period, the nylon lapping pad is replaced with a new pad and the sample is positioned on the pad and lubricated with standard 2 $\mu$m diamond oil paste and mineral kerosine. The wheel is then run again for 30 minutes. In a third lapping process, the nylon pad is again replaced and the sample is run on the wheel for 45 minutes using 0.5 $\mu$m diamond oil paste and mineral kerosine as the lapping lubricant. Finally, in a fourth lapping process, the nylon pad is again replaced and the sample is run on the wheel for 2 hours using 0.1 $\mu$m diamond oil paste and mineral kerosine as the lapping lubricant. This last lapping process using diamond paste imparts the desired nanometric features on the planarized surface.

If the arbitrarily-shaped host lattice sample was of such a small size that it was mounted on an optical fiat, the sample is removed from the flat, after the last lapping process, by melting the wax on the fiat using a hot plate and removing the sample from the melted wax. Whether or not an optical fiat support was employed, the sample is preferably cleaned at the end of the lapping procedure, following the multistage solvent cleaning process described above in connection with the wire drawing procedure, or other suitable cleaning procedure.

Alternative mechanical processing techniques may be employed to produce nanometric surface topology for enhancing condensed anharmonicity according to the teachings of the invention herein. For example, in one method according to the invention, a diamond stylus is used to mechanically scribe the surface of a host lattice material in a predetermined scribe pattern. The diamond stylus is preferably "ultrasharp" in that the effective working tip diameter of the stylus is of nanometric proportions, and can thereby produce nanometric-sized scribe patterns. The stylus is precisely moved across the surface of the material using a computer-controlled actuating mechanism. Such a system and methods for using the system to produce nanometric scribe patterns are disclosed in U.S. patent application Ser. No. 929,341, entitled "Method and apparatus for forming nanometric features on surfaces," filed on Sep. 13, 1992, by Harry Clark et al., and herein incorporated by reference. An extension of this diamond stylus patterning technique employs a stylus fixture having an array of such diamond tips which each are characterized by nanometic-sized tip radii. The array of tips provides the ability to in tandem scribe many patterns across the surface.

Using such a system, scratched relief topology is imparted to the surface of, e.g., a sheet of host lattice material. It is not required that the original surface topology of the sheet be planar, but rather, the topology may even be slowly undulating. Active sensors, for example, or other means of the computer-controlled actuating mechanism permit an array of styli to ride lightly on the surface, no matter its topology, and additionally, restrict the depth of cut to, e.g., less than 2 $\mu$m. In this way, a large surface area can be processed in an acceptable time period. As described below, such a nanometrically processed sheet may be used in its initial form as a sheet or may be wound into a small spatial volume, to form a coiled tube, much in the manner of an electrolytic capacitor design.

According to a preferred embodiment of the invention herein, nanometric surface features are produced using the diamond stylus scribing scheme described above, in combination with a "post-scribe" ultrasonic anodic etch process. The application of an E-field during the etching serves to populate antibonding orbitals in the near surface of the host lattice, thereby facilitating decohesion of, typically, metallic bonds. Such an anodic etch is carried out using, e.g., a solution of hydrochloric acid diluted with three parts water. A platinum electrode may be employed, for example. The anodic cell is operated under :reverse bias at several milliamps/cm$^2$ for a selected time period, such as 300 seconds, sufficient to produce a high density of nanoscale features on the surface of the host lattice material. Ultrasonic agitation of the anodic etch bath promotes feature formation. The two-step scribe-anodic etch process produces a high density of nanoscale features on any size host lattice sheet.

There are still other materials processing techniques that result in surfaces with sub-microscopic features. For example, diamond turning, fly cutting, and milling techniques are suitable for creating surface structures. Alternatively, various metallurgical techniques may be employed; suitable metallurgical methods include the process of co-solidification of a binary mixture with low solubility in the solid phase. The resulting solidified matrix will have dendritic (needle-like) filaments in the midst of the second phase element. Selective etching of the second phase element results in a porous, spongy material with high curvature surfaces. Ni—Al and Pd—B are two examples of relatively insoluble metal systems that are preferred for this technique. Vapor deposition techniques that are customized to favor discontinuous, rather than smooth and continuous deposition characteristics result in sub-micron sized nucleation sites that enhance the anharmonicity of the underlying substrate surface. Conversely, vapor deposition of a smooth coating over a highly textured surface achieves this same result of sub-micron sized asperities. An example of this process is the autoclaving of open-cell polystyrene. The decomposition resulting from the autoclaving produces a carbonaceous skeleton with very small feature sizes.

Chemical vapor deposition (CVD) is a molecular level process whereby two molecules react only when conjoined on a hot surface. This thermally activated process is thus useful in producing a selected surface topology, because the two or more molecular species employed in the process do not react in the gas phase. Deposition onto a heated substrate can be precisely controlled with adjustments to the temperature of the substrate, as well as the relative composition of the gas phase constituents.

For this application, deposition quality and thickness are best obtained at low pressures, an operating regime providing the ability to produce very thin layers. This is especially true for an articulated surface, such as a pyrolized organic foam. Coating the interior regions of such a surface is referred to as chemical vapor infiltration (CVI). Clearly, ultrathin coatings are preferred for this application, lest the small pores of the foam plug up and obstruct the nanometric surface reactivity.

Whatever mechanical technique is chosen for imparting sub-micron sized surface features to a material surface, that technique should optimally provide a high density of surface asperities, which preferably include points, prisms, and corners, or comprise any geometries having features with a radius of curvature less than 0.5 $\mu$m, but preferably less than 0.2 $\mu$m. Such features provide a location 29 of small radius curvature. Geometries having a radius of curvature more than 0.2 $\mu$m will enhance anharmonicity to some extent, but to a lesser degree than smaller curvature surface features.

While nanometric surface features, as described above, have been shown to be effective in enhancing anharmonicity, techniques of the invention herein for discetization of metallic grain size at nanometric dimensions also provides the ability to promote enhanced anharmonicity. Based on prior work by Peyrad, et al., "Energy Localization in Nonlinear Lattices," *Physical Review Letters,* Vol. 70, no. 25, p. 3935, 1993, it is known that energy localization occurs in one-dimensional nonlinear lattices. The inventors herein have recognized that in three dimensions, discrete nanodots or nanocrystals of anharmonic metals can develop large amplitude oscillations resulting from quantum size effects. Rather than damping large oscillations, nonlinear nanodot structures favor the growth of large amplitude, low frequency anharmonic lattice oscillations. Such intrinsically localized vibrational states augment the anharmonicity enhancement provided by the schemes described above and provide a mechanism for sustaining resonant dynamic Jahn-Teller oscillations.

Such resonant oscillations are only to be expected to be observable in materials that have in some way been partitioned or discretized. In contrast to the expected material behavior, partitioning of condensed matter on a nanoscale relaxes the assumption of equi-partitioning of energy. Thus, local modes of vibration that would normally decay in a harmonic lattice spontaneously grow in amplitude in a nonlinear, anharmonic lattice. These massive, but localized oscillations do not follow classical continuum mechanics principles.

For example, it has been shown by Suryanarayana, in "The Structure and Mechanical Properties of Metallic Nanocrystals," *Metallurgical Trans. A,* Vol. 23, p. 1074, 1992, that materials with ultrafine grain dimensions are characterized by extremely high diffusion rates. Such high diffusion rates provide the ability to diffuse a guest species, e.g., a hydrogen isotope such as deuterium, in a host lattice, e.g., nickel or a palladium silver alloy, to a high ratio.

There are many materials processing techniques within the scope of the invention for introducing resonant anharmonic oscillations into a guest species of a host lattice. Grain boundaries, stacking faults, free surfaces and abrupt compositional variations are materials structures that discretize or partition condensed matter to develop the vibrational instabilities that are recognized by the inventors herein to promote nuclei interaction. The simplest such method is grain refinement, which may be produced via splat cooling, atomization, selective deposition techniques, and cold working. Cold working by mechanical attrition has been shown to provide nanograined, polycrystalline material composition by Koch, in "The Synthesis and Structure of Nan, crystalline Materials Produced by Mechanical Attrition," *Nanostructured Materials,* Vol. 2, p. 109, 1993.

Cold working or work hardening tends to result in metal morphology that is brittle and prone to fracture. Such fracture, i.e., large cracking, of surfaces is to be avoided here because an electric field applied to such a cracked surface would not penetrate into cracks and fissures. As a result, dissolved guest hydrogen isotopes in a host lattice would have an available path to be reemitted from the host material, thereby preventing the ability to attain a high guest to host ratio. Thus, optimization of grain size must be balanced against tendency of a grained material to fracture. Annealing is not a viable technique because it causes grain growth.

Figure 4A:
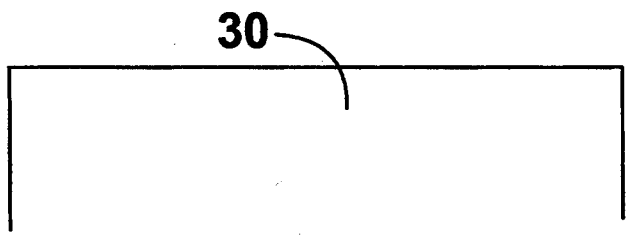
FIGS. 4A-4F illustrate the steps of a first method for lithographically defining nanoscopic surface features according to another aspect of the invention.

As an alternative to mechanical and metallurgical techniques for producing nanometric surface features, lithographic wet-etch techniques may be used. For example, referring to FIG. 4A, in a first lithographic process, a bare substrate 30 of a selected host lattice material, for example, nickel, is provided with a selected crystallographic orientation, for example, the 110 or 100 orientation. The 110 crystal faces are favored in the case of a nickel host lattice substrate because the 110 planes support the highest solubility of hydrogen isotopes of any crystallographic planes.

Figure 4B:
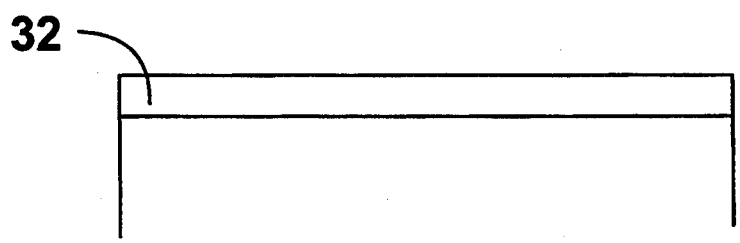
Figure 4C:
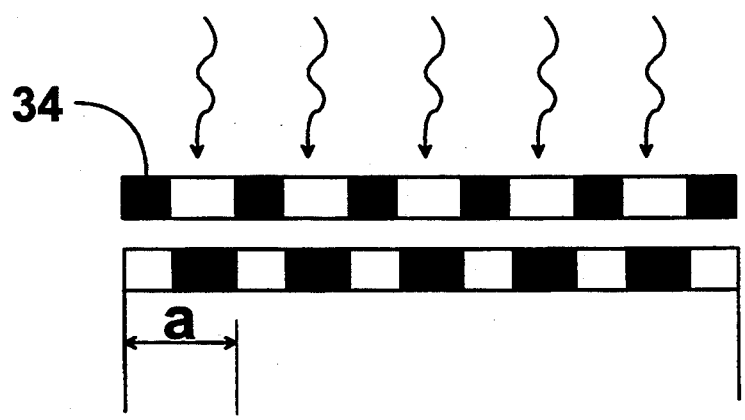
Figure 4D:
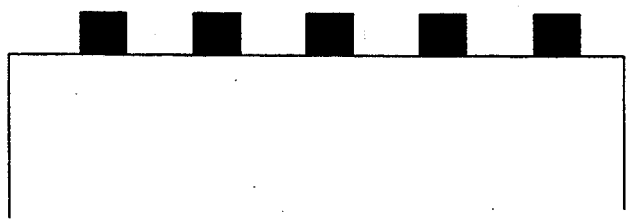
Figure 4E:
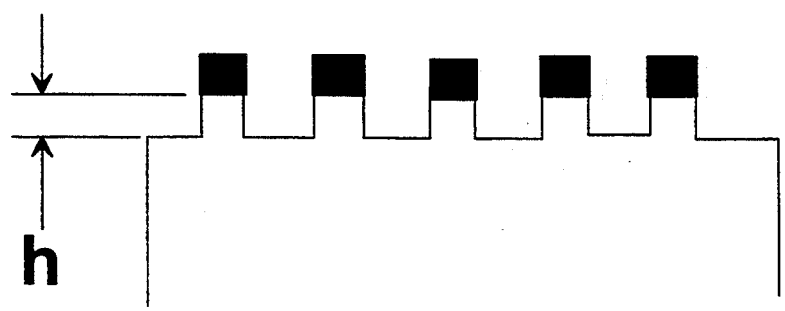
Figure 4F:
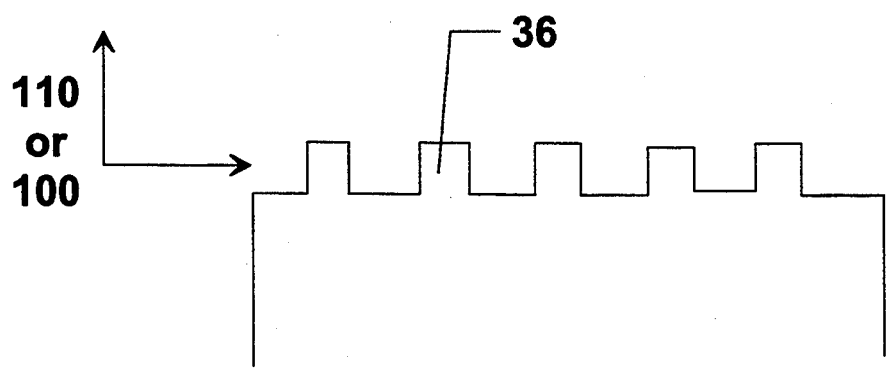
Figure 5A:
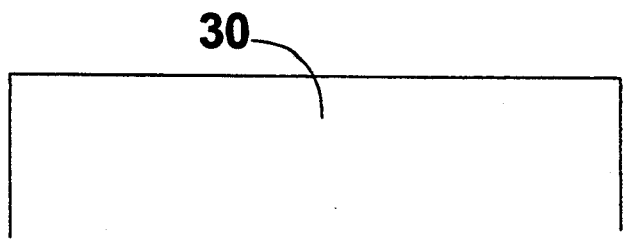
FIGS. 5A-5F illustrate the steps of a second method for lithographically defining nanoscopic surface features according to another aspect of the invention.
Figure 5B:
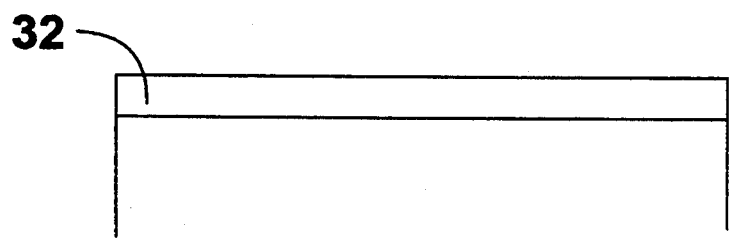
Figure 5C:
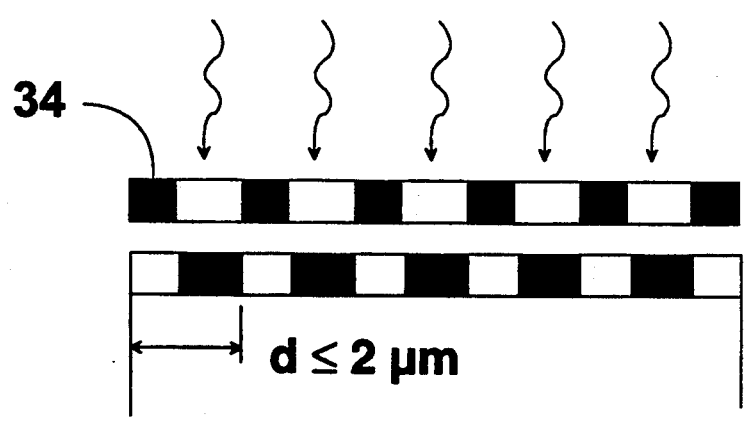
Figure 5D:
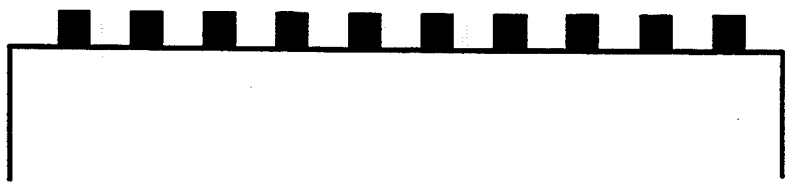
Figure 5E:
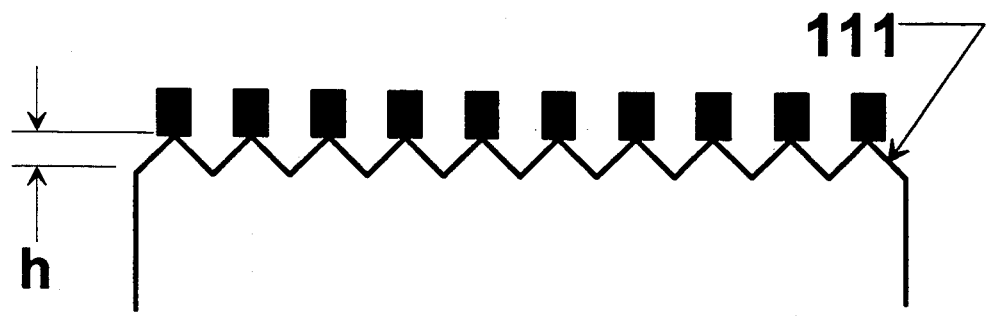
Figure 5F:
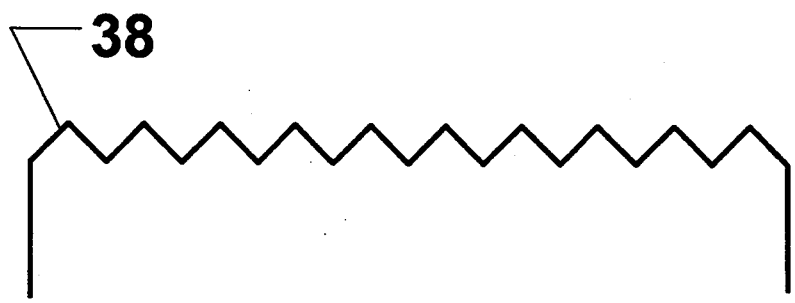

As shown in FIGS. 4B, 4C and 4D, photoresist 32 is spun on the substrate and exposed using a patterned lithographic mask 34 having a selected pattern of submicron sized geometries. Preferably, the maximum pattern dimension, d, or "duty cycle" of repeated pattern is about 0.2 $\mu$m in length. Such nanoscale features require the use of thin, state of the art photoresists. The unexposed resist is then removed using standard techniques to produce a photoresist etch mask. As shown in FIGS. 4E and 4F, the underlying substrate is then anisotropically etched using an appropriate etch to produce grooves in the substrate surface having a depth, h, of less than about 1 $\mu$m. Grooves of a greater height are less preferable because they would allow the prismatic faces of grooves exceeding about 1 $\mu$m to reconstruct to a more harmonic, high atomic coordination state. After removing the resist etch mask using standard photoresist processing techniques, the substrate 30 is provided with a topology of steps 36 which all ideally exhibit sharp corners and straight walls.

In a second lithographic process, shown in FIGS. 5A–5F, a bare substrate 30 oriented in a preferred crystallographic orientation of [100] has photoresist spun on its surface. The resist is then exposed using a mask having a maximum pattern width, d, of 1 $\mu$m in a grid pattern. The unexposed resist is removed using standard resist process techniques and the substrate is preferentially etched through openings in the remaining photoresist etch mask. The preferential etch stops on the 111 crystallographic planes of the substrate lattice, which act as etch stop planes and cause the etch to end at the intersection of the 111 planes within the substrate.

At the completion of the etch and after the removal of the photoresist etch mask using standard photoresist process techniques, the substrate surface comprises a pattern of grooves 38 having sharp points at the peak of the groove and a correspondingly reverse pointed indentation into the substrate surface. As explained in the discussion earlier, these grooves act to produce a low coordination of surface atoms, and consequently, to increase the anharmonicity of the hydrogen or hydrogen isotope dissolved in the surface material. It is intended that alternative lithographic techniques may also be employed to create suitable surface topology structures which enhance the anharmonicity of the surface material.

The inventors herein have found that mechanically derived surface nanofeatures manifest a different set of properties than lithographically etched features. By their nature, etch processes attack the most reactive regions of a surface preferentially over the less reactive regions. The less reactive regions are then, in turn, what is left exposed at the end of the etch process. These exposed regions are generally characterized by localized molecular orbitals. In contrast, mechanical processes, as opposed to etch processes, do not selectively modify surface regions of particular reactivity, thereby retaining the original surface reactivity, to a large extent.

However, wet-chemistry techniques, such as electroplating and chromatography, also provide mechanisms for creating finely dispersed nanometric structures on the surface of a material to enhance the material anharmonicity. For example, in one method according to the invention, enhanced anharmonicity of a material is achieved using nanometric-sized particles of a second material to promote selected surface geometry via a process such as electroplating the material of interest. In one scheme, nanometric particles such as fullerenes are coated with 3–20 atomic layers of a selected host lattice material, such as Ni, Ti, Pd, Zr, or their alloys discussed above. In this scheme, the diameter of the coated fullerene ($C_{60}$)-material coating combination is between 10–30 Å. The outer metal atomic layers have such a low coordination of atoms in this geometry that the outermost electron molecular orbitals of the layers de-localize and enhance the anharmonicity of the metal layer at its surface. To be useful, coated particles such as metalized fullerenes must be distributed in some inert media, such as zeolites or carbonaceous devitrified foams. The inert media serves two functions: it provides a support structure for the fullerenes, and it accommodates suspension of each $C_{60}$ Fullerene ball such that they each provide the entire $4\pi r^2$ of active surface area per ball. The inert media must be of a porous nature such that it is permeable, so that the fullerene balls can be charged via, e.g., an electrolyte, that provides the charging interstitial species, such as hydrogen, deuterium, or tritium.

In an alternative embodiment according to the invention, a superlattice of alternating materials is produced to enhance anharmonicity of the alternating materials at each superlattice layer interface. In one scheme, alternating layers of two materials are created using molecular beam epitaxy, organo-metallic chemical vapor deposition, evaporation, laser ablation, or sputtering techniques to fabricate a prespecified superlattice configuration. Ideally, these deposition and growth processes are highly controlled such that they produce high quality superlattice structures having abrupt interfaces at each layer. Preferred material groups for the alternating superlattice layer pairs include Au—Ni, Cu—Pd, Cu—Ni, Ag—Pd, Ni—Pd, Cu—Ni, Ni—Ti, Zr—P, Pd—P, Ni—Zr, Zr—Pd, and Zr—Ti. Other layer material groups may also be suitable. The layer thicknesses preferably vary from about 1–30 nm, depending on the growth or deposition technique. At these small layer thicknesses, the interfacial regions where one material layer meets the next are characterized by lattice distortion, altered atomic coordinations and orbital de-localization. As explained in the discussion above, these conditions promote an enhancement of the system's anharmonicity, and corresponding enhancement of nuclei interaction rate.

Ion sputtering of metallic targets is perhaps the superlattice fabrication process most amenable to a large area processing scheme. Such large area processing is ideal for creating a host lattice structure of desired size. In this process, the substrate is placed is a vacuum chamber, after which the chamber is evacuated. An ion beam is directed at, for example, a Nickel target located in the chamber or with access to the chamber, and nickel vapors are deposited onto the substrate. To produce the superlattice, the ion beam is alternately directed at the nickel target and, for example, a copper target, for a prescribed amount of time sufficient to deposit alternating layers of nickel and copper. Typical deposition times are based on a deposition rate of less than about 2 nanometers/minute. Based on this rate, a superlattice of 30 Ni—Cu layers, each 2 nm-thick, may be processed in one hour. The temperature of the superlattice substrate is selected to maximize the abruptness of each layer junction, keeping in mind that low temperature depositions reduce the amount of alloying at, for example, each Ni—Cu interface.

Superlattice structures so created enhance local anhamonic conditions not only at the external surface of the structures, but also at every interface in the superlattice array. Thus, for a 40–50 layer superlattice, the active volume of less than about 5 $\mu$m in thickness generates heat, due to anharmonicity effects on deuterium nuclei interaction at each interface of the superlattice, that cannot be transferred away from the interface as effectively as heat generated at the external surface of the superlattice. In this case, the interior of the lattice begins to "overheat" as the heat production via anharmonic interactions exceed the thermal diffusivity of the lattice materials. Temperature does not strongly effect anharmonic oscillation, as it does harmonic oscillation, but several hundred degrees Centigrade of generated heat may be sufficient to initiate a static Jahn-Teller distortion that results in quenching anharmonic oscillations.

Still other surface processing techniques are intended by the invention herein. For example, ion implantation of, for example, Cr into Ni, creates surface damage of the Nickel and provides a mechanism for producing the desired atomic delocalization.

Figure 6:
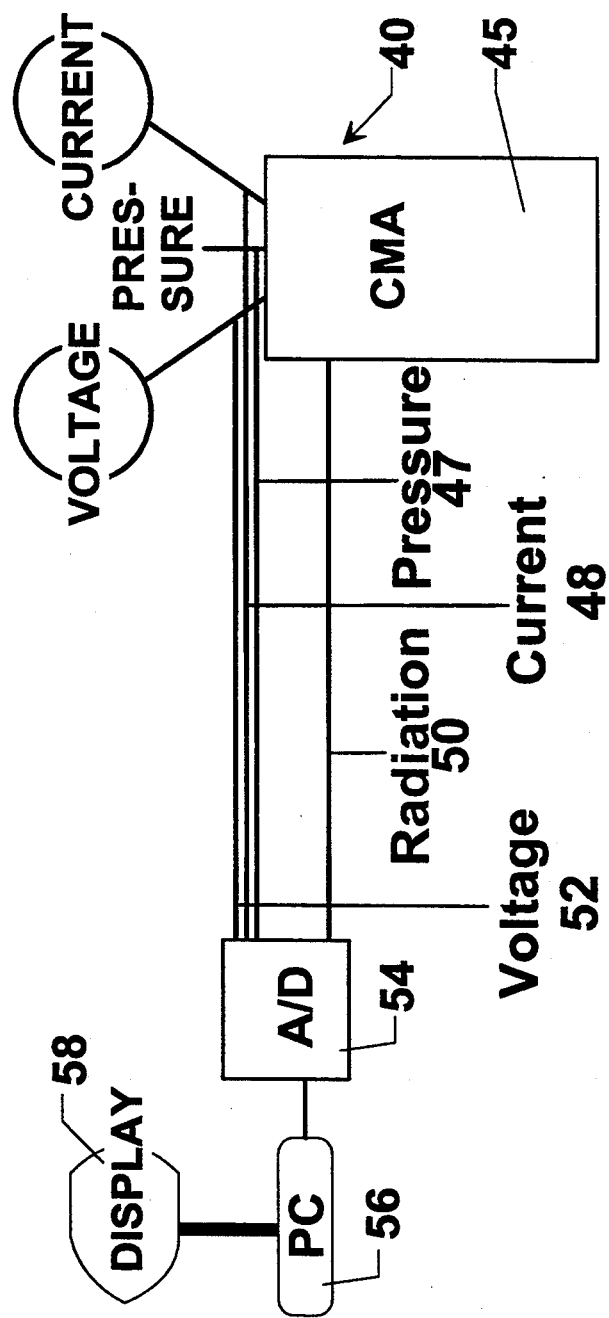
FIG. 6 schematically illustrates a cell activation and measurement set-up according to one aspect of the invention.

Referring to FIG. 6, there is shown an experimental setup 40 for producing and measuring the effect of enhanced anharmonicity on the interaction of guest sublattice nuclei dissolved in a host lattice. This setup 40 comprises, for example, an interaction cell 45, which is monitored to provide indicative signals via a pressure line 47, a current line 48, a radiation line 50, and a voltage line 52. Each of these signal lines are provided to an analog to digital converter (A/D) 54, which is connected to a PC 56, provided with a display 580

Figure 7:
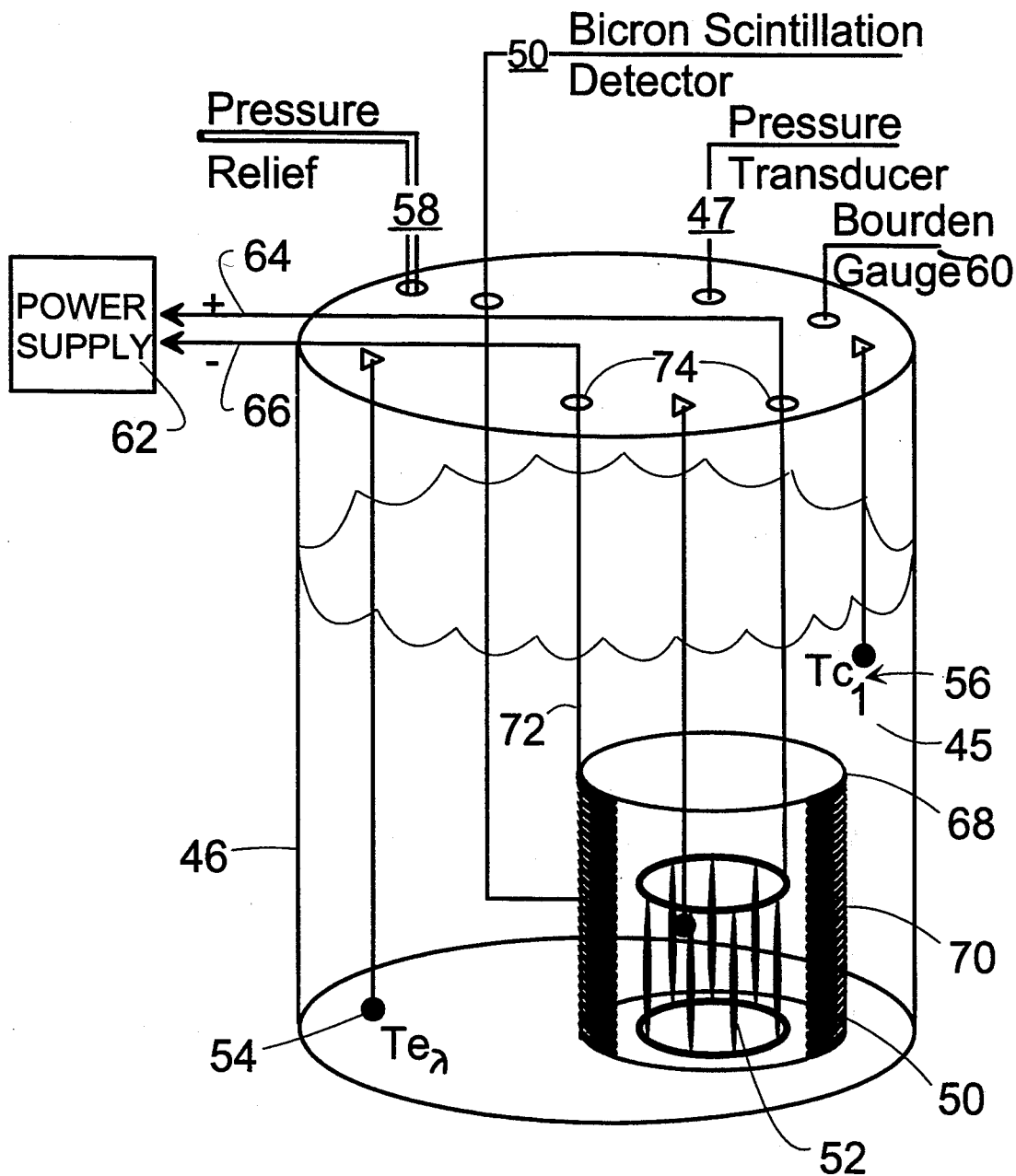
FIG. 7 schematically illustrates the activation cell of FIG. 6 in more detail.

As shown in FIG. 7, the interaction cell 45 consists of, for example, a 30 liter Pyrex calorimetry vessel 46 containing heavy water, light water, or a suitable mixture of the two, and a suitable electrolyte, such as 0.6 Molar potassium carbonate ($K_2CO_3$) 48 in which are submerged electrodes 50, 52, described below. Nonwater-based electrolytic solutions may also be suitable. The containment vessel 46 serves primarily to contain the electrolyte and not decompose contamination into electrodes submerged within it. The electrolyte provides a source of protons or deuterons without contaminating the surface of the electrodes. It also serves to establish a high double potential just outside the surface of the electrodes that provides a voltage gradient which shifts the dynamic equilibrium of solvation and favors a high density of protons or deuterons in the solid, once such species dissolves in the solid, as explained below. The volume of electrolyte is of secondary importance.

Heat transfer mechanisms are the main purpose of the water. Water is excellent in this capacity because it is chemically stable, inflammable, and has a large specific heat. Other electrolytes may be used. The electrical conductivity as well as the polarizability of the electrolyte may be preferably optimized for a given type of electrode material. For example, $NaCO_3$ or $RbCO_3$ may be used.

Also submerged in the liquid within the containment vessel are two thermocouples 54, 56, for determining the temperature in the liquid and the air above the liquid, respectively, within the vessel. Each of the thermocouples is monitored by suitable apparatus, such as the PC 56 of the experimental setup.

The containment vessel 46 is provided with a teflon lid (not shown), which is to be loosely mounted on the vessel once the vessel configuration is in place. The looseness of the mounting is intended to allow pressure release during operation such that no hazardous pressure build-up occurs within the vessel. Additionally, a pressure relief valve 58 may be provided on the vessel lid. The lid also provides for the pressure line mentioned above, and sensing lines for a gauge, for example, a Bourdon gauge, and a radiation detector 50. The radiation detector may be mounted either inside or outside the vessel, or preferable, one detector is mounted inside while a second detector is mounted outside of the vessel. The detector located inside the vessel may be located, for example, very dose to the electrode 50. One suitable detector (for Tritium) is the Bicron Industries Corp. scintillation detector.

A programmable DC power supply 62 is connected to the electrodes 50, 52 within the vessel via corresponding connections 66, 64, in a configuration as given below. The electrodes within the vessel comprise a cathode 50 and an anode 52. The cathode 50 consists of, for example, a perforated teflon spacer 68 having an 8-inch diameter, around which is wound a suitable host lattice material, such as nickel wire 70, or other selected material. A suitable amount of nickel wire is approximately 2–20 pounds of wire.

Such nickel wire 70 might comprise 0.003" nickel-200 wire. This commercially available wire is composed of >98.5% nickel, with small amounts of iron and cobalt. The wire may be treated with any of the surface topology processes described above to enhance the anharmonicity of the wire system. For example, the wire may be pulled through a laser-treated diamond die (as described above) such that surface relief structures on the die impart corresponding nanometric topological structures on the wire surface. The wire may be loosely braided into a cable of 125 strands, or some other braid scheme. The cable is wrapped loosely around the teflon spacer such that a maximum amount of wire surface area is exposed. The braiding scheme also provides the ability to increase the surface area for a given amount of wire material. Other cathode wire and material alternatives are also suitable. The wrapped spacer 68 is entirely submerged in the liquid 48 within the containment vessel. From its location in the vessel, the cathode 50, comprising the spacer 68 and wire 70, is connected to the negative line 66 of the power supply 62 via a spot-welded solid nickel rod 72, or other connecting line. This rod is thick enough to carry a high current density without overheating a connecting fitting 74 in the vessel lid.

In an alternate cathode configuration, a scintillation material is plated with nickel and attached to the cathode configuration 50 described above. This configuration provides a radiation detector mechanism in intimate contact with host lattice material, and may be connected to the radiation detector line 50 described above.

In a further alternative cathode configuration (not shown), a sheet of planar nickel or palladium alloy NSP processed as described above via, e.g. diamond scribing and anisotropic etching, is used in its sheet form as a cathode, or alternatively, rolled in a manner like that of electrolytic capacitors, forming a coiled tube which provides a large cathode surface area within a comparatively small volume. Such a cathode configuration, like the others, is entirely submerged in the liquid within a containment vessel. The rolled structure is particularly efficient in that it allows the liquid to deliver the protons or deuterons while at the same time providing a surface cooling mechanism via flushing of the liquid across the cathode surface.

Figure 8:
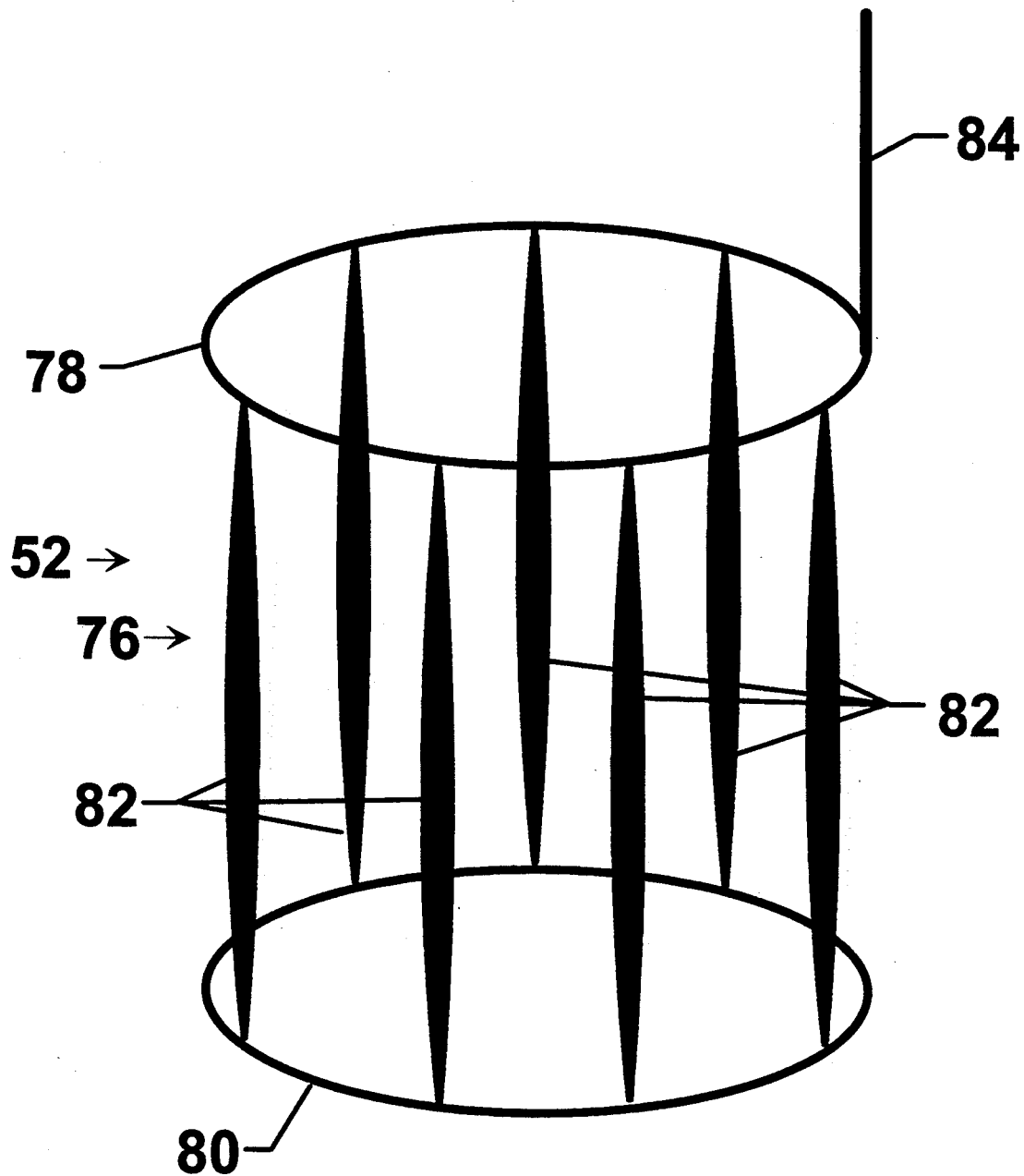
FIG. 8 schematically illustrates the anode of FIG. 7 in more detail.

Referring to FIG. 8, the anode 52 is shown in more detail. The anode consists of, for example, a cage 76 of chemically inert metal, such as titanium or nickel, which is plated with 0.0005" platinum. The cage diameter is 6" and the cage height is 6". Such a cage is made of top and bottom metal tings 78, 80, respectively, connected between which are metal fins 82, each fin having the dimensions of 0.030" in thickness and 5/8" in width. A number of such fins, five for example, are spot-welded to the top and bottom tings 78, 80. The particularly chosen size and number of fins is based on the amount of the cathode material used. Without an adequate anode surface size, the operation of the cell set-up may become current limited. The top ring 78 is also spot-welded to a ⅛" nickel rod 84 for connection to the positive line 64 of the power supply 62.

In operation, the power supply is set to provide a voltage drop of not less than 0.5 volts below the hydrogen overvoltage of 1.43 V forward biased between the anode and cathode. Electrolysis proceeds during the voltage application to dissolve a large ratio of hydrogen isotope, e.g., deuterium, into the host lattice; ideally a guest-host ratio of greater than 0.8 is achieved via the electrolysis.

As discussed above, nanoscale features on the host lattice, e.g., the nickel wire surface, enhance the transport of deuterium into the nickel surface and thereby promote such a high loading ratio. Further enhancement is provided using a chopped DC voltage rather than a constant DC voltage. The use of this signal scheme is motivated as follows. Maintenance of a high guest loading ratio requires a strong electric field gradient at the host surface. However, unintentional impurities in the electrolytic cell may hinder the existence of this gradient; such impurities in the cell invariably transport to the surface of the cathode, where they deposit on the cathode host surface. The impurities generally establish a polarization layer on the surface that reduces the effectiveness of the E-field there. This is due to the nature of the polarization layers responding in a capacitive manner; that is, the transport of charge across the polarization layer decays under the application of a constant DC field, as would be expected to occur across capacitor plates. Thus, such polarization layers act as an open circuit to an applied constant DC voltage. Accordingly, it is preferred that an AC voltage component be superimposed on a quiescent DC voltage to sustain transport across any polarization layers; such capacitive polarization layers act as a short circuit, rather than an open circuit, to the AC component.

The applied voltage is thus preferred to be a positive DC voltage with a duty cycle of between 5-2000 Hz, e.g., a square wave signal with a positive DC offset voltage, and an amplitude switching no less than 0.5 V below the hydrogen overvoltage of 1.43 V. With such a voltage scheme, the near surface of the host cathode acts like a diode, magnifying charge transport in the forward bias mode and restricting transport of dissolved guest species back out of the surface. In chemical terms, the DC chopping voltage acts to shift the dynamic equilibrium to a state favoring higher concentrations of guest species.

The current density of the operating cell is determined based on the cell's operating environment; the current density of the cathode host material is preferably not more than 100 $\mu$/cm$^2$. Given a requirement to keep the power density to a reasonable level, and considering the fact that the anharmonicity enhancement techniques of the invention are surface phenomenon, the power density is minimized via a cathode design providing an increase in surface to volume ratio of the cathode. For example, the cathode host material may be fabricated, as described above, as large, thin sheets, and then the two electrodes may be interleaved with anode structures wound in parallel with the cathode in a design like that of an electrolytic capacitor. In such a design, the electrode sheets are ideally fabricated thinly, for example, as thin as 0.001", separated by a distance of 0.025". This separation distance is provided by some insulating media, e.g., even the liquid itself. Heat resulting from the operation of such an anode-cathode configuration in the operating cell electrolyte is transferred via cycling of the electrolyte through the cylindrical volume.

During cell operation, the electrolyte temperature is operated at a selected point for optimizing transport of heat from the electrodes. For example, the electrolyte may be maintained at or near its boiling point because this phase change can transport energy at a constant temperature.

Operation of a cell in the manner described above provides optimization of the materials and system for enhancing anharmonic oscillations of the system and correspondingly enhancing the probability for interaction of nuclei within the lattice. As discussed above, the methods of the invention taught herein for producing this enhancement are all based on recognition by the inventors herein that nanometric discretization of highly nonlinear materials produces large localized vibrational instabilities, giving rise to large-amplitude oscillation of nuclei within the material. Such oscillation provides a corresponding enhancement of the potential for nuclei in the material to interact.

Other embodiments, features, and processing methods are intended within the scope of the invention, as defined by the claims.

We claim:

1. Apparatus for producing dynamic anharmonic oscillations of a condensed matter guest species comprising:

a condensed matter host lattice having surfaces upon at least a portion of which are provided surface features, said features having a radius of curvature less than 0.5 microns, and means for dissolving said guest species in said host lattice in a ratio of at least 0.5, the guest species undergoing said dynamic anharmonic oscillations upon dissolution in said host lattice.

2. The apparatus of claim 1 wherein said guest species is dissolved in said host lattice in a ratio of at least 0.8.

3. The apparatus of claim 1, wherein the host lattice comprises palladium.

4. The apparatus of claim 1, wherein the host lattice comprises an alloy of palladium silver.

5. The apparatus of claim 1, wherein the host lattice comprises the palladium silver alloy $Pd_{.77}Ag_{.23}$.

6. The apparatus of claim 1, wherein the host lattice comprises nickel.

7. The apparatus of any of claims 3, 4, 5, or 6, wherein the guest species comprises hydrogen.

8. The apparatus of any of claims 3, 4, 5, or 6, wherein the guest species comprises deuterium.

9. The apparatus of claim 1 wherein the means for dissolving said guest species comprises a container for an electrolytic solution containing said guest species.

10. The apparatus of claim 9 wherein the condensed matter host lattice comprises a palladium silver alloy cathode, and the means for dissolving said guest species farther comprises:
a platinum-coated anode,
a support for the cathode such that the cathode is submerged when in the electrolytic solution, and
a support for the anode such that the anode is submerged when in the electrolytic solution.

11. The apparatus of claim 10 wherein the cathode comprises a sheet of palladium silver alloy rolled to form a coil tube of said sheet.

12. The apparatus of claim 9 wherein the condensed matter host lattice comprises a cathode, and the means for dissolving said guest species further comprises:
an anode,
a support for the cathode such that the cathode is submerged when in the electrolytic solution, and
a support for the anode such that the anode is submerged when in the electrolytic solution.

13. The apparatus of claim 12 wherein the cathode comprises a wire.

14. The apparatus of either of claims 11 or 13 wherein the anode comprises at least one platinum-coated wire.

15. The apparatus of either of claims 11 or 12 wherein the electrolytic solution comprises a solution of heavy water and $K_2CO_3$.

16. The apparatus of either of claims 11 or 12 wherein the electrolytic solution comprises a solution of light water and $K_2CO_3$.

* * * * *

UNITED STATES PATENT AND TRADEMARK OFFICE
CERTIFICATE OF CORRECTION

PATENT NO. : 5,411,654  
DATED : May 2, 1995  
INVENTOR(S) : Brian S. Ahern, Keith H. Johnson, and Harry R. Clark, Jr.

Page 1 of 2

It is certified that error appears in the above-indentified patent and that said Letters Patent is hereby corrected as shown below:

Column 1, line 9, "Force" should read --Air Force--; line 31, "reposed" should read --reported--.

Column 2, line 26, "prefer, red" should read --preferred--; line 35, "gust" should read --guest--; and line 37, "is an" should read --in an--.

Column 3, line 12, "apparatus of" should read --apparatus for--.

Column 6, line 4, "dose" should read --close--.

Column 8, line 30, "ahoy" should read --alloy--.

Column 10, line 27, "tun" should read --turn--.

Column 13, lines 57, 59, 60, 61, and 63, and column 14, lines 22, 24, and 26, each occurrence of "fiat" should read --flat--.

Column 16, line 5, delete "29"; lines 61 - 62, "Nan, crystalline" should read --Nanocrystalline--.

Column 19, line 47, "50" should read --51--; line 50, "580" should read --58--; and line 55, delete "48".

UNITED STATES PATENT AND TRADEMARK OFFICE
CERTIFICATE OF CORRECTION

PATENT NO. : 5,411,654
DATED : May 2, 1995
INVENTOR(S) : Brian S. Ahern, Keith H. Johnson, and Harry R. Clark, Jr.

It is certified that error appears in the above-indentified patent and that said Letters Patent is hereby corrected as shown below:

Column 20, line 21, "58" should read --59--; line 24, "50" should read --51--; line 29, "dose" should read --close--; and line 59, delete "48".
Column 21, line 4, "50" should read --51--.
Column 22, line 18, "100 $\mu$/cm$^2$" should read --100 $\mu$A/cm$^2$--.
Claim 10, line 4, "farther" should read --further--.

Signed and Sealed this

Fourteenth Day of January, 1997

Attest:

BRUCE LEHMAN

*Attesting Officer*　　　*Commissioner of Patents and Trademarks*